United States Patent
Lida et al.

(10) Patent No.: US 10,757,157 B2
(45) Date of Patent: *Aug. 25, 2020

(54) ALLOCATING LIMIT TO ALLOWABLE END-TO-END LATENCY VARIATION BASED ON DESTINATION CAPABILITY

(71) Applicant: Valens Semiconductor Ltd., Hod Hasharon (IL)

(72) Inventors: Eyran Lida, Kfar Ha-Oranim (IL); Aviv Salamon, Raanana (IL)

(73) Assignee: Valens Semiconductor Ltd., Hod Hasharon (IL)

(*) Notice: Subject to any disclaimer, the term of this patent is extended or adjusted under 35 U.S.C. 154(b) by 1192 days.

This patent is subject to a terminal disclaimer.

(21) Appl. No.: 14/482,245

(22) Filed: Sep. 10, 2014

(65) Prior Publication Data
US 2015/0319213 A1    Nov. 5, 2015

Related U.S. Application Data

(60) Provisional application No. 61/988,247, filed on May 4, 2014.

(51) Int. Cl.
*H04L 29/06* (2006.01)
*H04L 12/911* (2013.01)
(Continued)

(52) U.S. Cl.
CPC ........... *H04L 65/602* (2013.01); *H04L 12/46* (2013.01); *H04L 12/6418* (2013.01);
(Continued)

(58) Field of Classification Search
CPC ....... H04L 65/602; H04L 65/608; H04L 65/80; H04L 43/0852
(Continued)

(56) References Cited

U.S. PATENT DOCUMENTS

| 5,862,126 A | 1/1999 | Shah et al. |
| 5,883,819 A | 3/1999 | Abu-Amara et al. |

(Continued)

OTHER PUBLICATIONS

G. Bianchi et. al., Endpoint Admission Control with Delay Variation Measurements for QoS in IP Networks, Apr. 2002, ACM SIGCOMM Computer Communications Review vol. 32, No. 2.
(Continued)

*Primary Examiner* — Meng Vang
(74) *Attorney, Agent, or Firm* — Active Knowledge Ltd.

(57) ABSTRACT

Methods and systems for establishing new streaming sessions based on capabilities of their destinations, including the steps of: receiving a request to establish a new streaming session over a new path, in presence of an existing streaming session. Receiving capabilities of a destination of the new streaming session. Allocating for the new streaming session a limit for an allowable end-to-end latency variation thereof, based on the capabilities. Estimating, before the new streaming session is established, an estimated end-to-end latency variation of the new streaming session, supposing it is established over the first path. Determining, based on comparing the estimated end-to-end latency variation with the limit, that the estimated end-to-end latency variation exceeds the limit. And rejecting the request, based on the determination.

20 Claims, 15 Drawing Sheets

(51) Int. Cl.
*H04L 12/64* (2006.01)
*H04L 12/26* (2006.01)
*H04L 12/24* (2006.01)
*H04L 12/46* (2006.01)
*H04L 29/08* (2006.01)

(52) U.S. Cl.
CPC .............. *H04L 29/06* (2013.01); *H04L 41/14* (2013.01); *H04L 41/147* (2013.01); *H04L 43/087* (2013.01); *H04L 43/0852* (2013.01); *H04L 43/16* (2013.01); *H04L 47/70* (2013.01); *H04L 65/1069* (2013.01); *H04L 65/4084* (2013.01); *H04L 65/60* (2013.01); *H04L 65/605* (2013.01); *H04L 65/608* (2013.01); *H04L 65/80* (2013.01); *H04L 67/141* (2013.01); *H04L 67/32* (2013.01)

(58) Field of Classification Search
USPC .......................................................... 709/219
See application file for complete search history.

(56) References Cited

U.S. PATENT DOCUMENTS

| | | | |
|---|---|---|---|
| 5,933,414 A * | 8/1999 | Georgiadis | .............. H04L 1/205 370/238 |
| 6,134,589 A | 10/2000 | Hultgren | |
| 6,198,725 B1 | 3/2001 | Constantin et al. | |
| 6,212,163 B1 | 4/2001 | Aida | |
| 6,442,164 B1 | 8/2002 | Wu | |
| 6,898,180 B2 | 5/2005 | Kinnunen | |
| 6,976,087 B1 | 12/2005 | Westfall et al. | |
| 7,013,318 B2 | 3/2006 | Rosengard et al. | |
| 7,372,819 B2 | 5/2008 | Martin | |
| 7,430,180 B1 | 9/2008 | Saint Etienne et al. | |
| 7,542,416 B2 | 6/2009 | Benmohamed et al. | |
| 7,701,980 B1 | 4/2010 | Bugenhagen | |
| 7,729,387 B2 | 6/2010 | Beck et al. | |
| 7,768,910 B2 | 8/2010 | Neidhardt et al. | |
| 8,102,764 B2 | 1/2012 | Castelli et al. | |
| 8,565,115 B2 | 10/2013 | Tanaka et al. | |
| 2003/0202469 A1 | 10/2003 | Cain | |
| 2004/0057446 A1 | 3/2004 | Varsa et al. | |
| 2005/0271071 A1* | 12/2005 | Madhavapeddi | ... H04L 12/2854 370/412 |
| 2006/0268701 A1 | 11/2006 | Clark | |
| 2009/0034540 A1* | 2/2009 | Law | ....................... H04L 12/462 370/400 |
| 2011/0317587 A1* | 12/2011 | Lida | .................... H04L 12/2832 370/254 |
| 2012/0324120 A1* | 12/2012 | Lee | ...................... H04L 12/2838 709/228 |
| 2013/0055136 A1* | 2/2013 | Aaron | .................. H04L 43/045 715/772 |

OTHER PUBLICATIONS

Jorg Liebeherr et. al., Exact Admission Control for Networks with a Bounded Delay Service.
Rene L. Cruz, A Calculus for Network Delay, Part I: Network Elements in Isolation, Jan. 1991, IEEE Transactions on Information Theory, vol. 37, No. I.
Abhay K. Parekh, A Generalized Processor Sharing Approach to Flow Control in Integrated Services Networks: The Single-Node Case, Jun. 1993, IEEE/ACM transactions on networking, vol. 1, No. 3.
Domenico Ferrari et. al., A Scheme for Real-Time Channel Establishment in Wide-Area Networks, Apr. 1990, IEEE journal on selected areas in communications. vol. X. No. 3.
Jean-Yves Le Boudec, Application of Network Calculus to Guaranteed Service Networks, May 1998, IEEE transactions on information theory, vol. 44, No. 3.
Qin Zheng, Connection Admission Control for Hard Real-Time Communication in ATM Networks, Dec. 1996, Mitsubishi electric research laboratories.
Cheng-Shang Chang, Stability, Queue Length and Delay of Deterministic and Stochastic Queueing Networks, 1994, IEEE Trans Automatic control vol. 39.
Rene L. Cruz, A Calculus for Network Delay, Part 11: Network Analysis, Jan. 1991, IEEE transactions on information theory. vol. 37. No. I.
Hoon-Tong Ngin, Generalised Minimum Queuing Delay: An Adaptive Multi-rate Service Discipline for ATM Networks.
Michel Mandjes et. al., End-to-end delay models for interactive services on a large-scale IP network, Jun. 28-30, 1999, 7th IFIP workshop.
Lothar Thiele et. al., Real-Time Calculus for Scheduling Hard Real-Time Systems.
Parekh, A.K.J., A Generalized Processor Sharing Approach to Flow Control in Integrated Services Networks: The Multiple Node Case*, Oct. 1991, LIDS-P-2074.

* cited by examiner

ALLOCATING LIMIT TO ALLOWABLE END-TO-END LATENCY VARIATION BASED ON DESTINATION CAPABILITY

BACKGROUND

Many packet switching networks are utilized for delivery of streaming media content, such as video, audio, voice and computer animation. The streaming media content is delivered over the network from source nodes, which provide the media content, to destination nodes, by which the users consume the media content. The source nodes can be set-top boxes, media streamers, video game consoles, personal computers, smartphones, etc., and the destination nodes can be television sets, computer displays, audio systems, smartphones, etc.

In addition to the end-nodes, such as the source nodes and the destination nodes, packet switching networks usually further include intermediate nodes (e.g., switches) and communication links over which the packets are transmitted between the nodes. A session of streaming media content is usually delivered, from the source node to the destination node, over a given path (route) that is usually selected when the session is established. The path includes elements such as the switches and the communication links.

Streaming media content is usually sensitive to jitter, also referred to as latency variation. Therefore, there is a need to maintain the latency variation of a streaming session from exceeding a certain limit.

BRIEF SUMMARY

In one embodiment, a network configured to admit streaming sessions based on capabilities of their destinations comprises an admission controller, a latency variation allocator, and a latency variation calculator. The admission controller is configured to receive a request to establish a new streaming session over a new path, in presence of an existing streaming session; wherein the existing streaming session is established over an existing path, and the new path and the existing path pass through an output port of a switch. The latency variation allocator is configured to: receive capabilities of a destination of the new streaming session, and allocate a limit for a first allowable end-to-end latency variation of the new streaming session based on the capabilities. The latency variation calculator is configured to estimate, before the new streaming session is established, an estimated end-to-end latency variation of the new streaming session, supposing the new streaming session is established over the new path. The admission controller is further configured to: determine, by comparing the estimated end-to-end latency variation with the limit, a determination that the estimated end-to-end latency variation exceeds the limit, and reject the request based on the determination.

In a further embodiment, a method for establishing new streaming sessions based on capabilities of their destinations comprises the following steps: receiving a request to establish a new streaming session over a new path, in presence of an existing streaming session; wherein the existing streaming session is established over an existing path, and the new path and the existing path pass through an output port of a switch. Receiving capabilities of a destination of the new streaming session. Allocating for the new streaming session a limit for an allowable end-to-end latency variation thereof, based on the capabilities. Estimating, before the new streaming session is established, an estimated end-to-end latency variation of the new streaming session, supposing it is established over the first path. Determining, based on comparing the estimated end-to-end latency variation with the limit, a determination that the estimated end-to-end latency variation exceeds the limit. And rejecting the request, based on the determination.

BRIEF DESCRIPTION OF THE DRAWINGS

The embodiments are herein described, by way of example only, with reference to the accompanying drawings. In the drawings.

DETAILED DESCRIPTION

Figure 1:
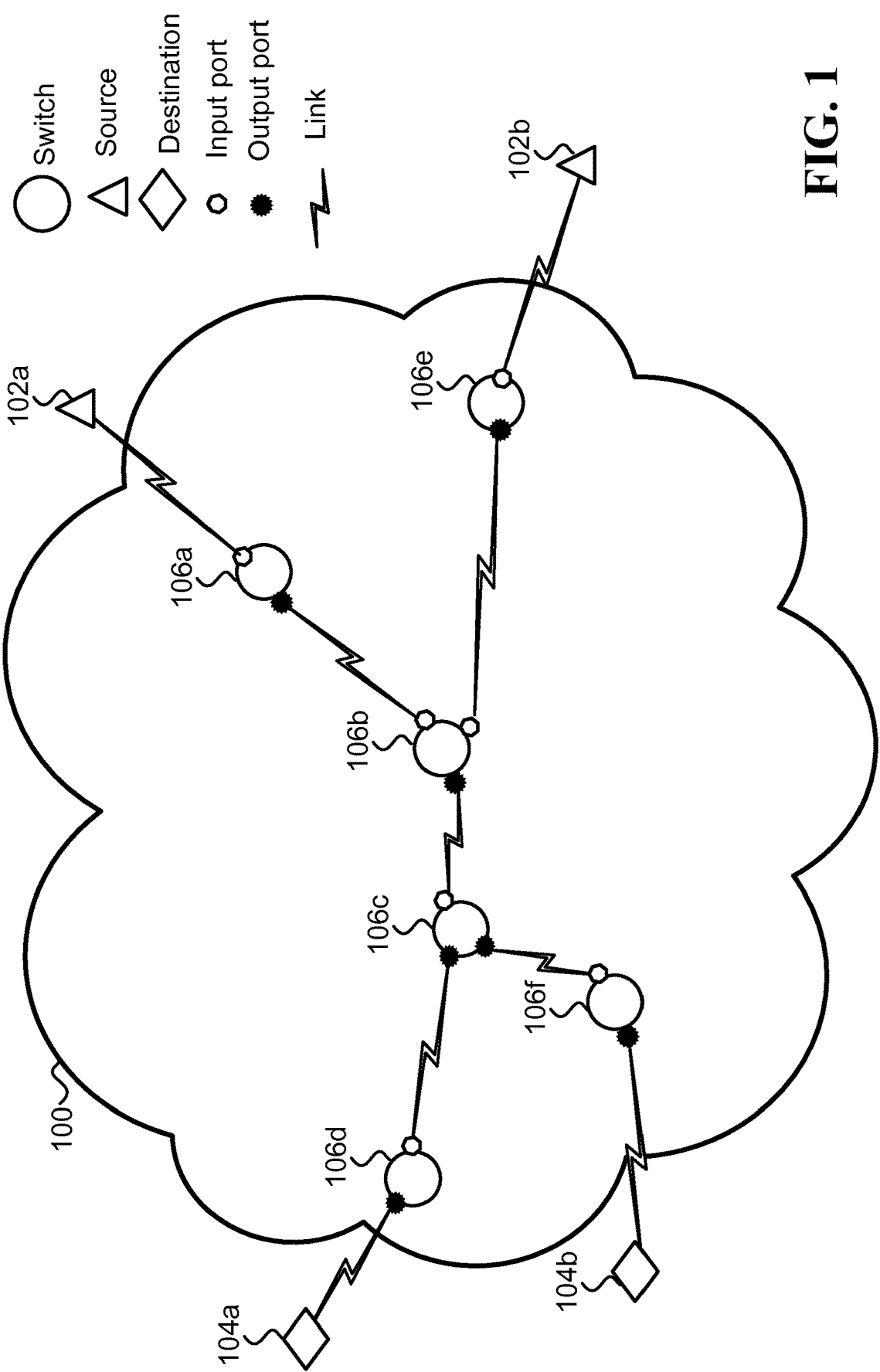
FIG. 1 illustrates one example of a network, which facilitates transmission of streaming sessions between endpoints coupled to the network.

FIG. 1 illustrates one example of a network 100, which facilitates transmission of streaming sessions between endpoints coupled to the network. The streaming sessions are transmitted from source end-nodes, which are the sources of the streaming sessions, to destination end-nodes, which are the destinations of the streaming sessions. Streaming sessions may also be referred to herein as sessions. The network comprises switches, which comprise input-ports, and output ports. The network further comprises links, which facilitate communication between the switches, and between the switches and the end-nodes. A link may facilitate communication from a source end-node to an input port of a switch, from an output port of a switch to an input port of another switch, or from an output port of a switch to a destination end-node.

A session is established over a path starting at the source of the session, passing through one or more switches, and terminating at the destination of the session. For example, a first session is established from a first source 102a to a first destination 104a over a first path traveling through the switches 106a, 106b, 106c, and 106d; and second session is established from a second source 102b to a second destination 104b over a second path traveling through the second switches 106e, 106b, 106c, and 106f.

A session comprises sequence of data units, which may be referred to as packets. The packets may be generated at the source, and delivered over the path to the destination. In one example, the time difference between the moment when the end of a given packet is generated at the source, and the moment when the end of the given packet is transmitted by an output port, is referred to as the local latency of the given packet at the output port; and the difference between the maximum and minimum local latencies of packets of the given session at the output port is referred to as the local latency variation of the given session at the output port. Similarly, in one example, the time difference between the moment when the end of a given packet is generated at the source, and the moment when the end of the given packet is received by the destination, is referred to as the end-to-end latency of the packet; and the difference between the maximum and minimum end-to-end latencies of packets of the session is referred to as the end-to-end latency variation of the session.

In one example, two or more sessions enter a switch through two or more different input ports and exit from the switch at the same output port. In such cases, a packet of a first session may be delayed at the output port while one or more packets of one or more other sessions are transmitted through the output port. This delay may be referred to as a switching delay, or as a scheduling delay. In one example, different packets of the first session may be subject to different scheduling delays, and the local latency variation of the first session may be caused by the difference between the minimum scheduling delay and the maximum switching delay.

Figure 2:
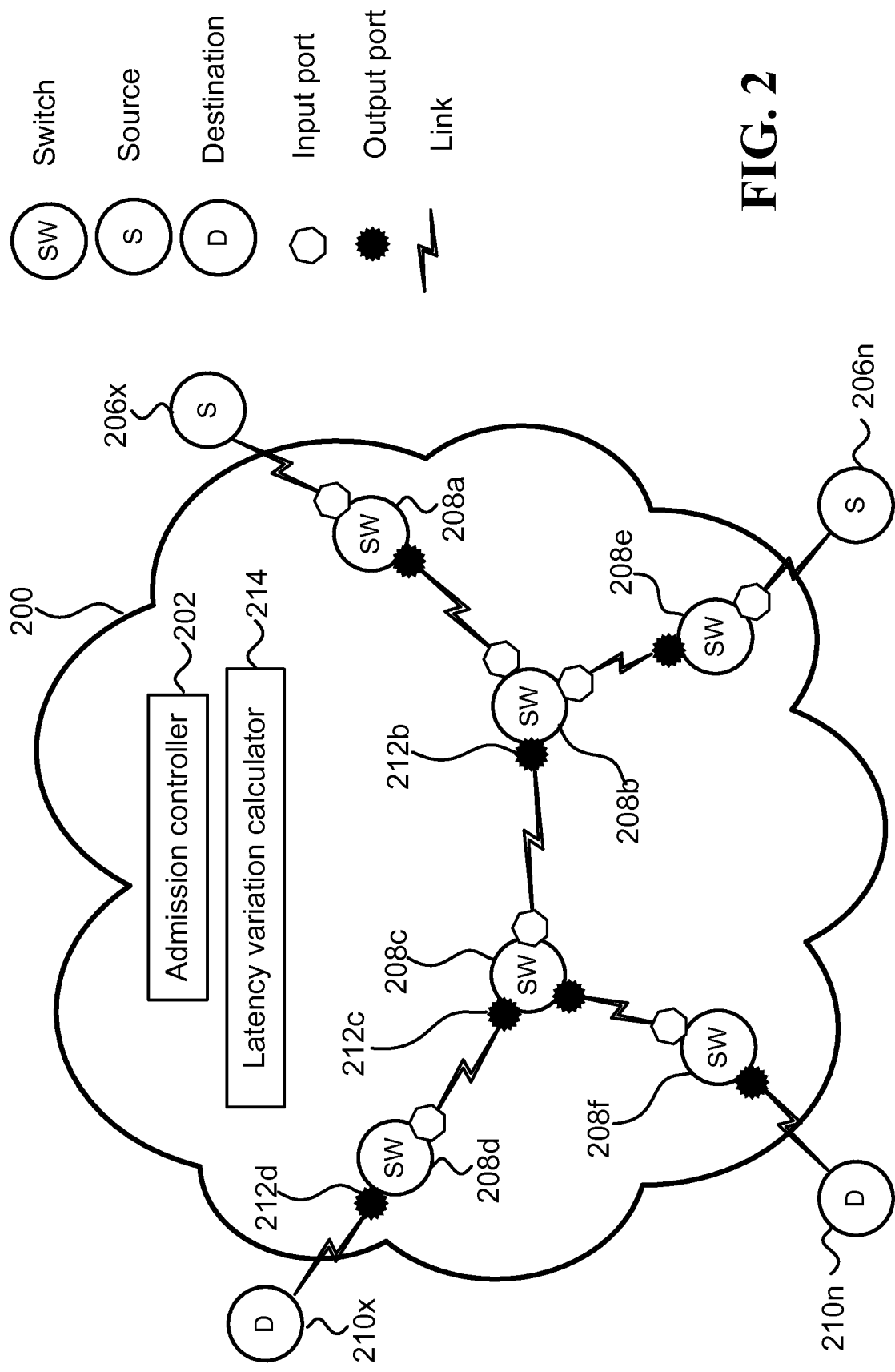
FIG. 2 illustrates one embodiment of a network, which admits new streaming sessions while maintaining latency variations of existing streaming sessions.

FIG. 2 illustrates one embodiment of a network 200, which admits new streaming sessions while maintaining latency variations of existing streaming sessions. Network 200 may be the network 100 in FIG. 1, or any other suitable network. Sessions established over the network 200 are associated with respective limits for their end-to-end latency variations, and the network maintains the end-to-end latency variations of the sessions within those limits. As explained further below, with reference to FIG. 6, the limits for the end-to-end latency variation may be allocated based on the capabilities of the respective destinations. The network 200 may maintain the end-to-end latency variations of the sessions within their limits by rejecting new sessions whose latency variations are expected to exceed their limits, and/or by rejecting new sessions that are expected to cause latency variations of existing sessions to exceed their limits.

Network 200 comprises an admission controller 202. The admission controller is configured to receive a request to establish a new session over a new path, in presence of an existing session, which is already established over an existing path. The existing path starts at the source 206x, is passing through switches 208a, 208b, 208c, and 208d, and terminates at destination 210x; and the new path starts at source 206n, is passing through switches 208e, 208b, 208c, and 208f, and terminates at destination 210n. As illustrated in FIG. 2, both the existing path and the new path are passing through the same output port 212b of the switch 208b. The existing session is associated with a limit for its end-to-end latency variation, and network 200 admits the new session only if the admission of the new session is expected not to increase the end-to-end latency variation of the existing session above its limit.

Network 200 further comprises a latency variation calculator 214. The latency variation calculator estimates, before the new session is established, an estimated end-to-end latency variation of the existing session, supposing the new session is established over the new path. In other words, the latency variation calculator estimates, before the new session is established, the new end-to-end latency variation that the existing session will encounter after the new session is established. Thereby, the latency variation calculator enables the network to determine, before the new session is established, whether the new session is expected to cause the end-to-end latency variation of the existing session to exceed its limit, and to decide, based on this determination, whether to admit or reject the new session.

The admission controller 202 compares the estimated end-to-end latency variation of the existing session with its limit. If the admission controller determines that the estimated end-to-end latency variation exceeds the limit, it rejects the request, and the new session is not established; otherwise, it admits the session.

In one embodiment, admission control of a new session over a new path is performed sequentially. At each switch over the new path, the admission controller identifies the locally affected existing sessions, i.e., the existing session whose paths are passing through the same output port of the switch as the path of the new session. For each locally affected existing session, the latency variation calculator estimates the end-to-end latency variation of the locally affected existing session, supposing the new session is established over the new path. The estimated end-to-end latency variations are compared by the admission controller with their respective limits. If one of the limits is exceeded, the new session is rejected; and if no limit is exceeded, the new session is provisionally admitted with respect to the switch, and the request is further evaluated with respect to the next switch over the new path. Eventually, if the request reaches the last switch over the path (which is the switch coupled to the destination of the new session) without being rejected, the new session is admitted.

In one example, the admission controller receives a request to establish a new session over the new path, in presence of an existing session already established over an existing path, where both the new path and the existing path are passing through an output port 212b of the switch 208b. After the request is provisionally admitted in respect to switch 208e, which is the first switch of the new path, the request is evaluated with respect to the switch 208b, which is the next switch over the new path. The admission controller identifies the existing session to be a locally affected session with respect to switch 208b. Following this identification, the latency variation calculator estimates the end-to-end latency variation of the existing session, supposing the new session is established over the new path, and the admission controller compares the estimated end-to-end latency variation with its limit. If the admission controller determines that the estimated end-to-end latency variation exceeds its limit, it rejects the request; otherwise, it provisionally admits the request, and forwards the request to be evaluated with respect to switch 208c, which is the next switch of the new path. If the request eventually reaches switch 208f, which is coupled to the destination 210n of the new session, the admission controller identifies that the second request was not previously rejected, and admits the second request.

In one embodiment, the latency variation calculator estimates the end-to-end latency variation of the existing session, supposing the new session is established over the new path, as follows: the latency variation calculator predicts the local latency variation of the existing session at the output port 212b, supposing the new session is established over the new path, and then estimates the end-to-end latency variation of the existing session, based on the predicted local latency variation.

In one embodiment, the local latency variation estimates the end-to-end latency variation of the existing session by sequentially predicting the local latency variations of the existing session at the output ports of the following switches of the existing path.

In one example, the latency variation calculator predicts the local latency variation of the existing session at the output port 212b; predicts the local latency variation of the existing session at the next output port 212c, based on the predicted local latency variation at the output port 212b; and estimates the estimated end-to-end latency variation of the existing session based on the predicted local latency variation at the next output port 212c. In one example, the local latency variation further predicts the local latency variation of the existing session at the output port 212d of the switch 208d, based on the predicted local latency variation at the output port 212c. Since switch 208d is coupled to the destination 210x of the existing session, the estimated end-to-end latency variation may be taken to be equal to the predicted local latency variation of the existing session at output port 212d.

In some cases, simplified estimations of the end-to-end latency variation of the existing session may be utilized, as described below.

It is noted that in the worst case, the latency variation of a session accumulates over the path of the session. In other words, the local latency variation of a given session at a given output port of a given switch may, in some cases, be a sum of the local latency variation of the given session at an output port of a previous switch, plus an additional latency variation introduced at the given output port. The end-to-end latency variation of a given session is the local latency variation of the last output port (the output port coupled to the destination of the session). Therefore, in one embodiment, the latency variation calculator utilizes the predicted local latency variation as a lower bound for the estimated end-to-end latency variation. In other words, if the predicted local latency variation of the existing session at a given output port exceeds the limit associated with the existing session, the new session is rejected, based on a worst-case assumption that the end-to-end latency variation of the existing session will also exceed the limit.

It is further noted that the local latency variation at a given output port may be lower than the end-to-end latency variation, because latency variation might be accumulated over the next output ports of the path. Therefore, in one embodiment, the latency variation calculator estimates the end-to-end latency variation of the existing session, supposing the new session is established over the new path, as follows: the latency variation calculator predicts the local latency variation of the existing session at the output port, supposing the new session is established over the new path; the latency variation calculator calculates the additional local latency variation of the existing session at the output port, supposing the new session is established over the new path, based on a difference between the predicted local latency variation, supposing the new session is established over the new path, and a current local latency variation of the existing session at the output port, before the new session is established; and the latency variation calculator estimates the end-to-end latency variation of the existing session based on the additional latency variation, and on the current end-to-end latency variation of the existing session (for example by adding the additional local latency variation to the current end-to-end to end latency variation). In a distributed embodiment, such as the embodiment described with reference to FIG. 4, the local latency variation calculator associated with a given switch may maintain the current value of the end-to-end latency variation of the existing session, which is passing through the given switch, in order to facilitate the estimation of the new end-to-end latency variation of an existing session, supposing the new session is established, by adding the additional local latency variation to the current end-to-end latency variation of the existing session.

In one example, the admission controller receives a request to establish a new session over a new path, in presence of first and second existing sessions which are associated with first and second limits for their end-to-end latency variations, and which are established over first and second existing paths, respectively. The new path and the two existing paths share two common output ports. The first existing path and the new path are passing through a first output port of a first switch, and the second existing path and the new path are passing through a second output port of a second switch. The latency variation calculator estimates, before the second new session is established, first and second end-to-end latency variations of the first and second existing sessions, respectively, supposing the second new session is established over the new path. The admission controller compares the first and second estimated end-to-end latency variations with their limits. If the admission controller determines that at least one of the estimated end-to-end latency variations exceeds its limits, it rejects the request to establish the new session; otherwise, it admits the request to establish the new session.

In one example, the admission controller receives a request to establish a new session over a new path, and the new session is associated with a limit for its end-to-end latency variation. The latency variation calculator predicts, before the second new session is established, the end-to-end latency variation of the new session, supposing the new session is established over the new path. The admission controller compares the predicted end-to-end latency variation of the new session with its limit. If the admission controller determines that the predicted end-to-end latency variation exceeds its limit, it rejects the request to establish the new session; otherwise, it admits the request to establish the new session.

In one example, latency variation is caused by variations of the scheduling delay, which is the delay from the moment a packet arrives, until the moment the packet is scheduled for transmission.

In one example, all sessions are scheduled according to the same priority, and packets are scheduled according to their order of arrival. In this example, the scheduling delay is determined by the size of the backlog at the output port when the packet arrives (i.e. the sum of lengths of all packets waiting for scheduling when the packet arrives), divided by the capacity of the link. When bursts of packets of plurality of sessions arrive concurrently, the largest backlog occurs when the last packet of all bursts arrives, and this backlog may be calculated as the sum of the lengths of all the bursts, minus the length of the longest burst. Therefore, the maximum scheduling delay may be calculated by summing of the burst sizes of all the sessions, subtracting the burst size of the longest session, and then dividing the result by the capacity of the link. The minimum scheduling delay can be considered zero (referring to a case when no packets are waiting to be scheduled). Therefore, the local latency variation may be calculated by calculating the sum of the burst sizes of all the sessions, subtracting the longest burst size, and dividing the result by the capacity of the link.

Figure 3:
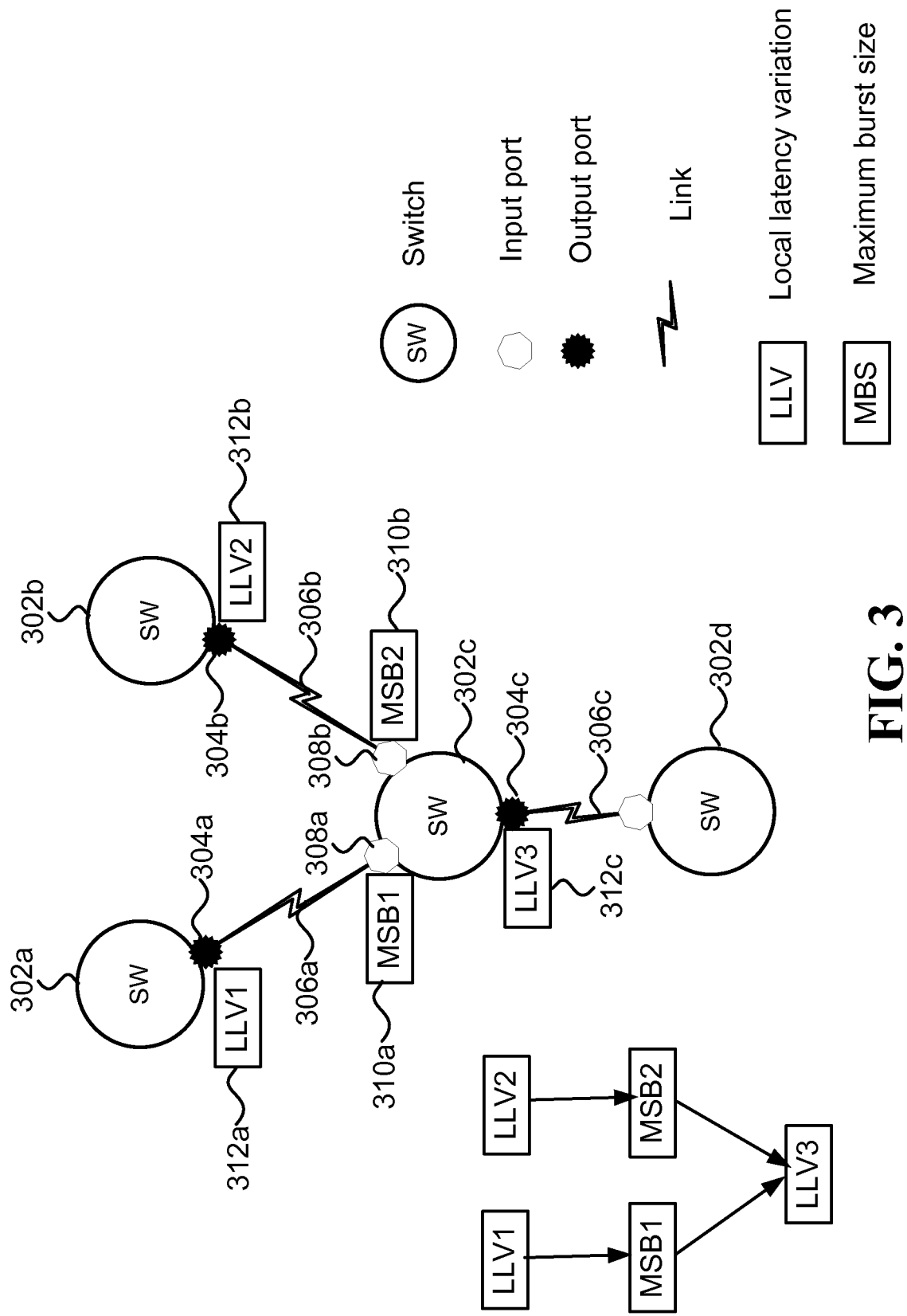
FIG. 3 illustrates one embodiment of calculating local latency variation of a streaming session at an output port of a switch, in presence of another streaming session passing through the same output port of the switch.

FIG. 3 illustrates one embodiment of calculating local latency variation of a streaming session at an output port of a switch, in presence of another streaming session passing through the same output port of the switch. First and second sessions exit from first and second switches 302a and 302b via first and second output ports 304a and 304b, travel over first and second links 306a and 306b, and enter a third switch 302c via first and second input ports 308a and 308b, respectively. The first and second sessions further exit from the third switch 302c via a third output ports 304c, travel over a third link 306c, and enter a fourth switch 302d. In one embodiment, the latency variation calculator receives first and second maximum burst sizes 310a and 310b of the first and second session at the first and second input ports, and calculates the local latency variation 312c of the first session at the third output port 304c, based on the first and second maximum burst sizes 310a and 310b.

In one embodiment, the latency variation calculator receives first and second local latency variations 312a and 312b of the first and second sessions at the first and second output ports 304a and 304b of the first and second switches 302a and 302b, respectively. The latency variation calculator calculates the first and second maximum burst sizes 310a and 310b of the first and second session at the first and second input ports, and calculates the local latency variation 312c of the first session at the third output port 304c, based on the first and second maximum burst sizes.

In one embodiment, the latency variation calculator calculates the maximum burst size 310a by multiplying the latency variation 312a by the capacity of the link 306a, and adding the maximum burst size of the first session at its source.

In one example, sessions are scheduled at different priorities, when a packet belonging to a given session with a higher priority is scheduled before any other packet belonging to a session with a lower priority, regardless of their order of arrival, and packets belonging to sessions with the same priority are scheduled according to their order of arrival. In this example, the scheduling delay of a session with a given priority may be calculated as the sum of the scheduling delay caused by all sessions with higher priorities, the scheduling delay caused by the all sessions with the same priority, and the scheduling delay caused by all sessions of lower scheduling delay. The maximum scheduling delay caused by the sessions of higher priority may be calculated as the sum of the maximum bursts sizes of those sessions, divided by the capacity of the link. The maximum scheduling delay caused by the sessions of the same priority may be calculated as explained above. In preemptive cases, the scheduling delay caused by packets with lower priority may be considered zero; and in non-preemptive cases, the scheduling delay caused by sessions with lower priority may be calculated as the maximum burst size of those sessions, divided by the link capacity.

Returning to FIG. 2: In one embodiment, the latency variation calculator 214 may comprise a central latency variation calculator comprised in a single node of the network, which may be a switch, or another node. In one example, the central latency variation calculator may be comprised in a central controller of the network.

In one embodiment, the central latency variation calculator maintains a central database comprising parameters of the existing sessions. When a request to establish a new session is received, the central latency variation receives parameters of the new session, and identifies the affected existing sessions, i.e., the existing sessions whose end-to-end latency variation might be affected by the admission of the new session. The central latency variation then estimates the end-to-end latency variation of the affected sessions based on the parameters of the new session and the existing session.

In one embodiment, the admission controller comprises plurality of admission controlling processors, which are incorporated in plurality of nodes, for example in plurality of switches; and each one of the admission controlling processors is able to perform the central calculations. In one embodiment, one admission controller processor is selected to be the central controller, and the others remain in standby. In another embodiment, all controllers perform the same calculations in parallel.

Figure 4:
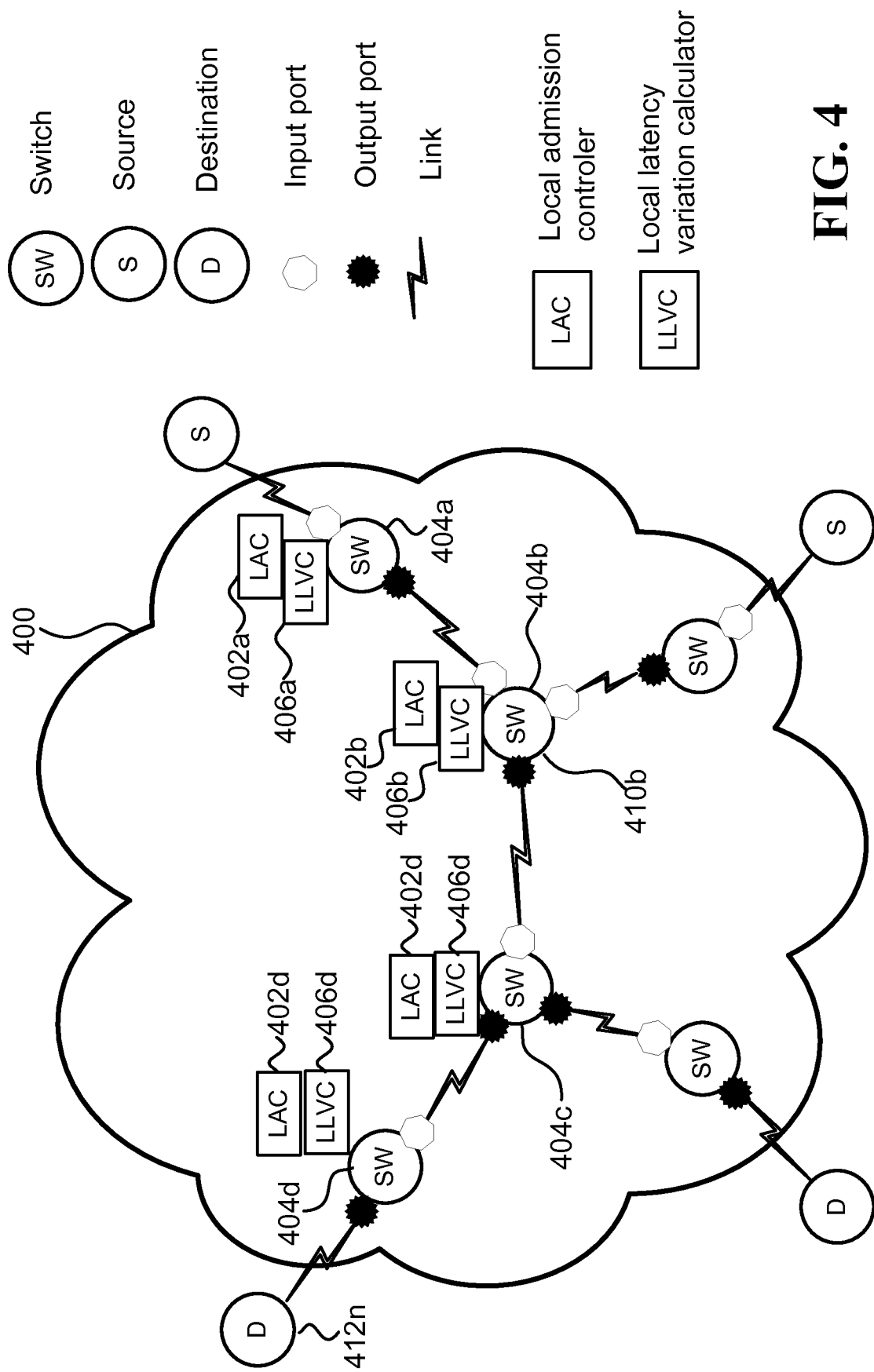
FIG. 4 illustrates one embodiment of a network, which admits streaming sessions in a distributed manner.

FIG. 4 illustrates one embodiment of a network 400, which admits streaming sessions in a distributed manner. The network 400 may be one example of the network 200 of FIG. 2. In the network 400, the admission controller and the latency variation calculator comprise a local admission controller and a local latency variation calculator, respectively, associated with each switch. The local admission controller and a local latency variation calculator associated with a switch may be comprised within the switch, or reside at a close proximity to the switch.

In the example illustrated in FIG. 4, the admission controller comprises local admission controllers 402a to 402d associated with switches 404a to 404d, respectively; and the latency variation calculator comprise local latency variation calculators 406a to 406d, associated with the same switches. A request is received to establish a new session over a new path, in presence of an existing session already established over an existing path. The new path is passing through switches 402a, 402b, 402c, and 402d; the existing path is passing through switches 402e, 402b, 402c, and 402f; and both paths are passing through an output port 410b of the switch 404b. The request is provisionally admitted by the local admission controller 402a, and then forwarded to switch 404b. The local admission controller 402b receives the request; and the local latency variation calculator 406b estimates the end-to-end latency variation of the existing session, supposing the new session is established over the new path. The local admission controller 402b compares the estimated end-to-end latency variation with its respective limit. If the local admission controller 402b determines that the estimated end-to-end latency variation exceeds the limit, it rejects the request; otherwise, it provisionally admits the request, and forwards it to the switch 404c. If the request eventually reaches switch 404d, which is coupled to the destination 412n of the new session, the local admission controller 402d receives the request, inspects it, determines that the second request was not previously rejected, and admits the second request.

Figure 5:
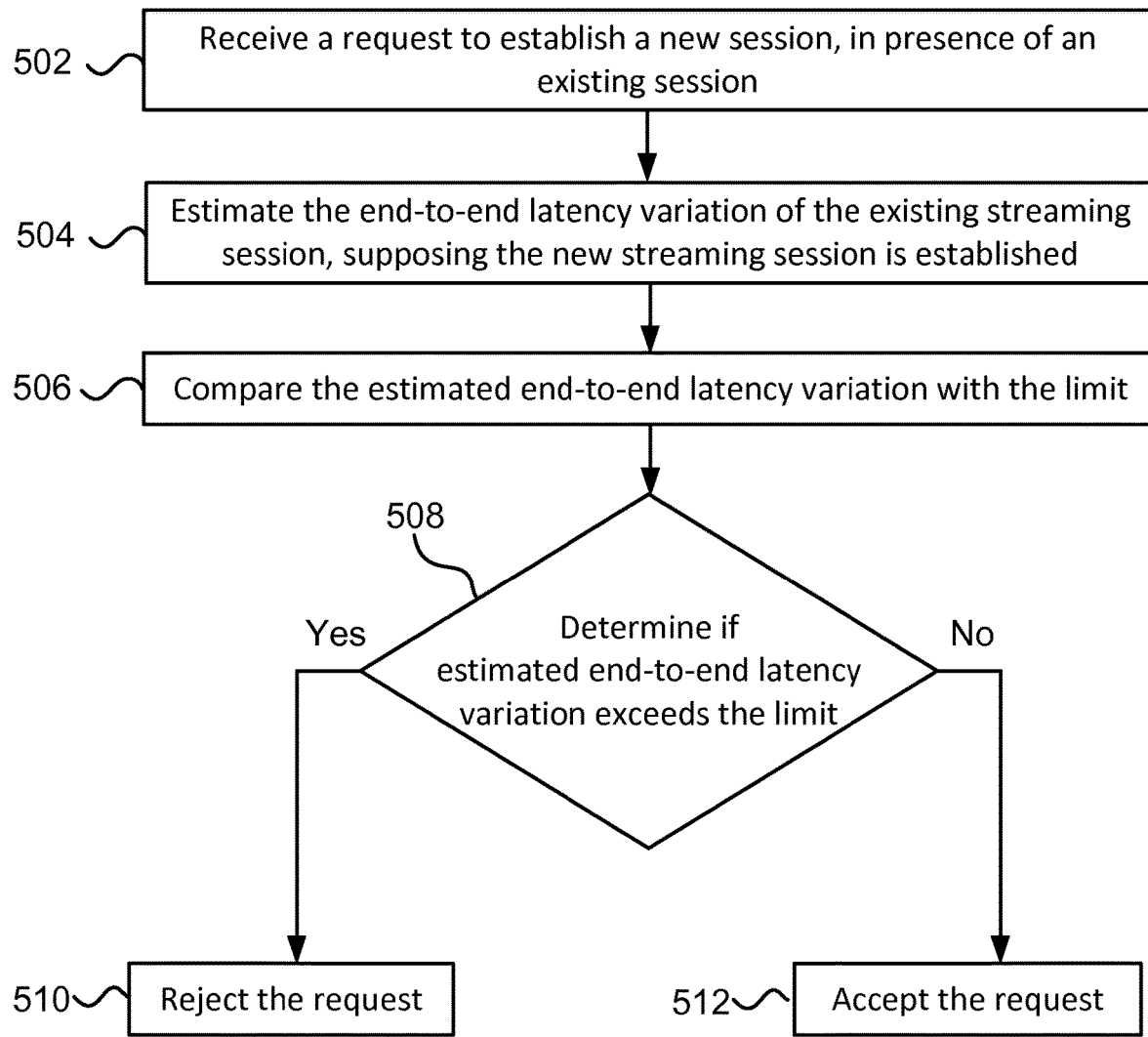
FIG. 5 illustrates one embodiment of a method for admitting new streaming sessions while preventing latency variations of existing sessions from exceeding their respective limits.

FIG. 5 illustrates one embodiment of a method for admitting new streaming sessions while preventing latency variations of existing sessions from exceeding their respective limits. The method may be performed by the network 200 of FIG. 2, by the network 400 of FIG. 4, or by another suitable network. The method includes at least the following steps:

In step 502, receiving a request to establish a new session over a new path, in presence of an existing session, which is established over an existing path. The new path and the existing path are passing through an output port of a switch, and the existing session is associated with a limit for its end-to-end latency variation.

In step 504, estimating, before the new session is established, an estimated end-to-end latency variation of the existing session, supposing the new session is established over the new path.

In step 506, comparing the estimated end-to-end latency variation with the limit.

In step 508, determining whether the estimated end-to-end latency variation exceeds the limit.

In step 510, if the estimated end-to-end latency variation exceeds the limit, rejecting the request.

And in step 512, if the estimated end-to-end latency variation does not exceed the limit, admitting the request.

In one embodiment, admission control of a new session over a new path is performed sequentially, as explained with reference to FIG. 2 above. In one example, the method comprises: receiving a request to establish a new session over the new path, in presence of an existing session already established over an existing path, where both the new path and the existing path are passing through a given output port of a given switch; estimating, with respect to the given switch, the end-to-end latency variation of the existing session, supposing the new session is established over the new path; comparing the estimated end-to-end latency variation of the existing session with its limit; determining whether the estimated end-to-end latency variation of the existing session exceed its limit; if the estimated end-to-end latency variation of the existing session exceed its limit, rejecting the request to establish the new session; and otherwise provisionally admitting the second request with respect to the given switch, and forwarding the provisionally admitted request to be further evaluated with respect to the next switch, whose input port is coupled to the given output port of the given switch.

In some cases, the method further comprises: identifying, at the last switch (the switch coupled to a destination of the new session) that the request has not been rejected, and admitting the second request.

In one embodiment, the method further comprises predicting the local latency variation of the existing session at the output port, supposing the new session is established over the new path, and estimating the end-to-end latency variation of the existing session based on the predicted local latency variation.

In one embodiment, the method further comprises predicting the local latency variation of the existing session at a given output port of a given switch; and predicting the local variation of the existing session at the next output port of the next switch over the path of the existing session, based on the predicted local latency variation at the given output port.

In one embodiment, the predicted local latency variation is utilized as a lower bound for the estimated end-to-end latency variation.

In one embodiment, the method further comprises: predicting the local latency variation of the existing session at the output port, supposing the new session is established over the new path; calculating the additional local latency variation of the existing session at the output port, supposing the new session is established over the new path, based on a difference between the predicted local latency variation, supposing the new session is established over the new path, and a current local latency variation of the existing session at the output port, before the new session is established; and estimating the end-to-end latency variation of the existing session based on the additional latency variation, and on the current end-to-end latency variation of the existing session (for example by adding the additional local latency variation to the current end-to-end to end latency variation).

In one example, the method further comprises:

Receiving a request to establish a new session over a new path, in presence of first and second existing sessions, which are associated with first and second limits for their end-to-end latency variations, and which are established over first and second existing paths, respectively. The new path and the two existing paths share two common output ports. The first existing path and the new path are passing through a first output port of a first switch, and the second existing path and the new path are passing through a second output port of a second switch.

Estimating, before the second new session is established, first and second end-to-end latency variations of the first and second existing sessions, respectively, supposing the second new session is established over the new path.

Comparing the first and second estimated end-to-end latency variations with their limits.

Determining whether at least one of the estimated end-to-end latency variations exceeds its limits.

If at least one of the estimated end-to-end latency variations exceeds its limits, rejecting the request to establish the new session; and otherwise admitting the request.

In one example, the method further comprises:

Receiving a request to establish a new session over a new path. The new session is associated with a limit for its end-to-end latency variation.

Predicting, before the second new session is established, the end-to-end latency variation of the new session, supposing the new session is established over the new path.

Comparing the predicted end-to-end latency variation of the new session with its limit.

Determining whether the predicted end-to-end latency variation exceeds its limit.

If the predicted end-to-end latency variation exceeds its limit, rejecting the request to establish the new session; and otherwise admitting the request.

In one example, first and second sessions exit from first and second switches via first and second output ports, travel over first and second links, and enter a third switch via first and second input ports, respectively; and the first and second sessions further exit from the third switch via a third output port, travel over a third link, and enter a fourth switch. In one embodiment, the method further comprises receiving first and second maximum burst sizes of the first and second session at the first and second input ports, and calculating the local latency variation of the first session at the third output port, based on the first and second maximum burst sizes.

In one embodiment, the method further comprises calculating the first maximum burst size by multiplying the first latency variation by the capacity of the first link, and adding the maximum burst size of the first session at its source.

Figure 6:
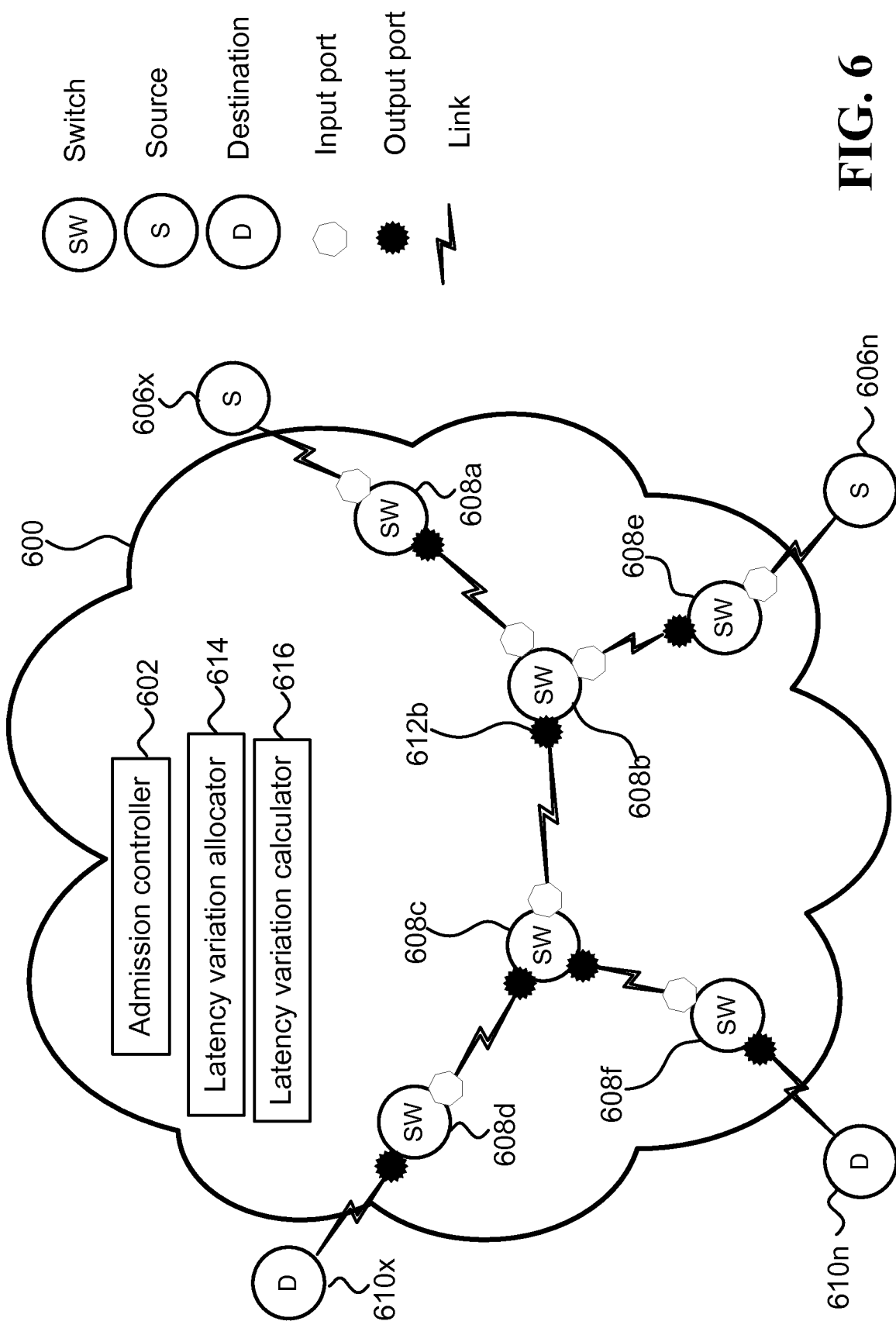
FIG. 6 illustrates one embodiment of a network, which admits streaming sessions based on capabilities of their destinations.

FIG. 6 illustrates one embodiment of a network 600, which admits streaming sessions based on capabilities of their destinations. Network 600 may be the network 200 in FIG. 2, or any other suitable network. Sessions established over the network 200 are associated with respective limits for their end-to-end latency variations, and the network maintains the end-to-end latency variations of the sessions within their limits by rejecting requests to establish new sessions whose end-to-end latency variations are expected to exceed their limits. The network may further reject requests to establish new sessions, which are expected to cause the end-to-end latency variations of existing sessions to exceed their limits.

The limit of the end-to-end latency variation of a given session is determined based on the capability of the destination of the given session to handle latency variations. For example, in order to compensate for the end-to-end latency variation of a given session, the destination may allocate a "jitter buffer" whose size is determined based on the throughput at the source, and on the end-to-end latency variation at the destination. Therefore, the limit of the end-to-end latency variation may be determined based on the buffer size available at the destination.

Network 600 comprises an admission controller 602. The admission controller is configured to receive a request to establish a new session over a new path, in presence of an existing session, which is already established over an existing path. The existing path starts at the source 606x, is passing through switches 608a, 608b, 608c, and 608d, and terminates at destination 610x; and the new path starts at source 606n, is passing through switches 608e, 608b, 608c, and 608f, and terminates at destination 610n. Both the existing path and the new path are passing through the same output port 612b of the switch 608b. In some embodiments, the new session and/or the existing session may be HDBaseT sessions.

Network 600 further comprises a latency variation allocator 614. The latency variation allocator receives the capabilities of the destination 610n of the new session, and allocates a limit for the end-to-end latency variation of the new session, based on the capabilities of the destination 610n. In one embodiment, the capabilities of the destination may comprise the size of the buffer which the destination is able to allocate in order to compensate for the end-to-end latency variation.

Network 600 further comprises a latency variation calculator 616. The latency variation calculator estimates, before the new session is established, an estimated end-to-end latency variation of the new session, supposing the new session is established over the new path.

The admission controller 602 compares the estimated end-to-end latency variation of the new session with its limit. If the admission controller determines that the estimated end-to-end latency variation exceeds the limit, it rejects the request to establish the new session; otherwise, it admits the request to establish the new session.

In one embodiment, the latency variation allocator is implemented in a distributed manner. The distributed latency variation allocator comprises local latency variation allocators, which are associated with the switches coupled to the destinations, so that latency variation allocation based on the capability of a given destination is performed by the local latency variation allocator associated with the switch coupled to the given destination. Alternatively, the latency variation allocator may be implemented in a centralized manner.

In one embodiment, the latency variation allocator receives the capabilities of the destination 610x of the existing session, and allocates for the existing session a limit for its end-to-end latency variation, based on the capabilities of the destination. In one example, the limit may have been allocated when the existing session has been admitted. The admission controller receives a request to establish a new session over the new path, in presence of the existing session, which is established over the existing path. The latency variation calculator estimates, before the new session is established, the end-to-end latency variation of the existing session, supposing the new session is established over the new path. The admission controller compares the estimated end-to-end latency variation of the existing session with its limit. If the admission controller determines that the estimated end-to-end latency variation of the existing session exceeds its limit, it rejects the request to establish the new session; otherwise, it admits the request to establish the new session.

In one example, the latency variation allocator receives the capabilities of first and second destinations of first and second existing sessions, and allocates for the first and second existing sessions first and second limits for their end-to-end latency variations, based on the capabilities of their destinations. The admission controller receives a request to establish a new session over a new path, in presence of the first and second existing sessions, which are established over first and second existing paths. The latency variation calculator estimates, before the new session is established, the end-to-end latency variations of the first and second existing sessions, supposing the new session is established over the new path. The admission controller compares the estimated end-to-end latency variations of the first and second existing sessions with their limits. If the admission controller determines that at least one of the estimated end-to-end latency variations exceeds its limit, it rejects the request to establish the new session; otherwise, it admits the request to establish the new session.

In one example, first and second sessions are exit from first and second switches via first and second output ports, travel over first and second links, and enter a third switch via first and second input ports, respectively. The first and second sessions further exit from the third switch via a third output port, travel over a third link, and enter a fourth switch. In one embodiment, the latency variation calculator receives the first and second maximum burst sizes of the first and second session at the first and second input ports, and calculates the local latency variation of the first session at the third output port, based on the first and second maximum burst sizes.

In one embodiment, the latency variation calculator receives first and second local latency variations of the first and second sessions at the first and second output ports of the first and second switches, respectively. The latency variation calculator calculates the first and second maximum burst sizes of the first and second session at the first and second input ports, and calculates the local latency variation of the first session at the third output port, based on the first and second maximum burst sizes.

Figure 7:
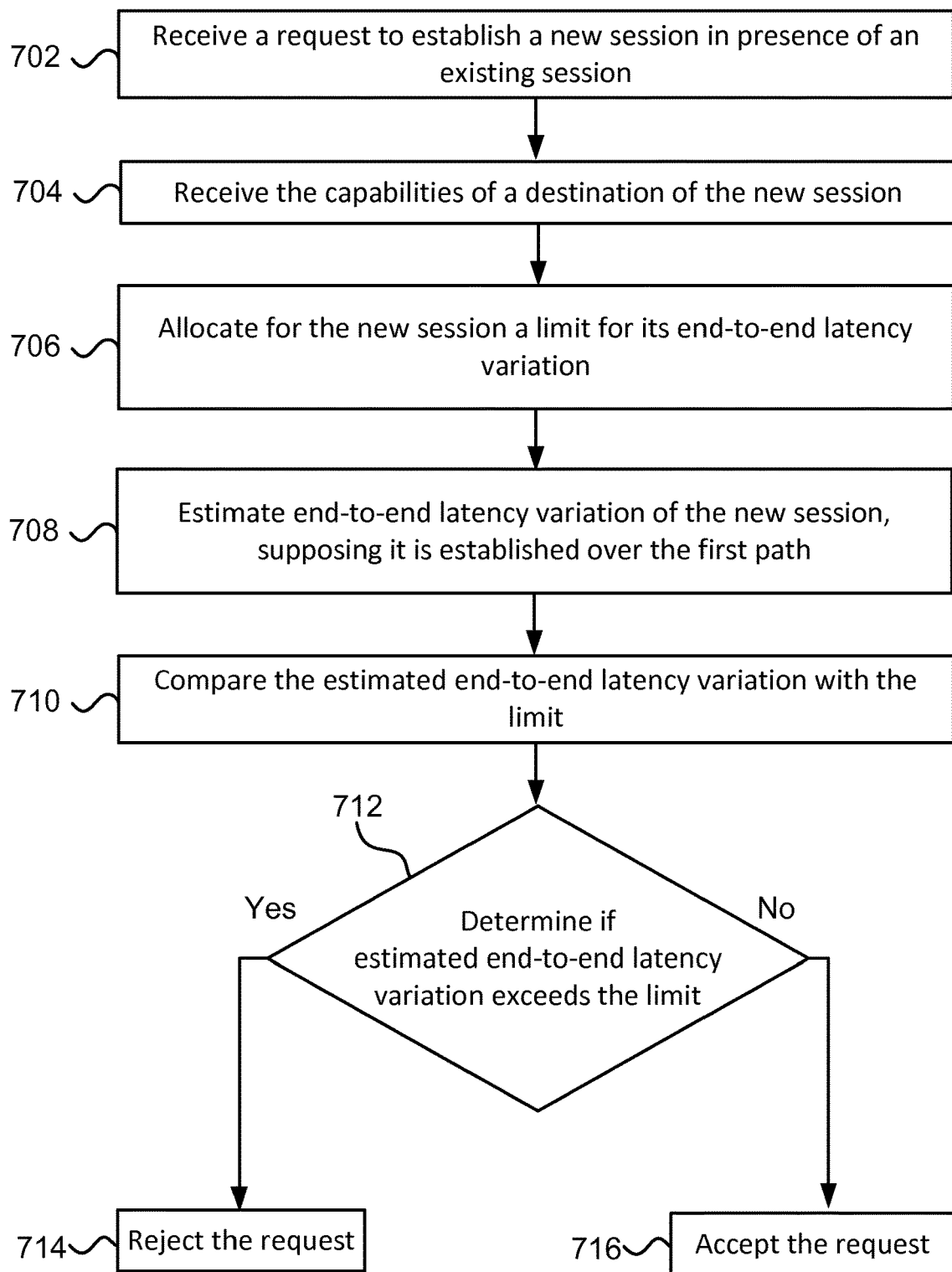
FIG. 7 illustrates one embodiment of a method for establishing new streaming sessions, based on capabilities of their destinations.

FIG. 7 illustrates one embodiment of a method for establishing new streaming sessions based on capabilities of their destinations. The method may be performed by network 600 of FIG. 6, or by any other suitable device. The method includes at least the following steps:

In step 702, receiving a request to establish a new session over a new path, in presence of an existing session. The existing session is established over an existing path, and the new path and the existing path are passing through an output port of a switch.

In step 704, receiving the capabilities of a destination of the new session. The new and/or existing sessions may be HDBaseT sessions. The capabilities of a destination may comprise a buffer size of the destination.

In step 706, allocating for the new session a limit for its end-to-end latency variation, based on the capabilities of the destination of the new session.

In step 708, estimating, before the new session is established, the end-to-end latency variation of the new session, supposing it is established over the first path.

In step 710, comparing the estimated end-to-end latency variation with its limit.

In step 712, determining whether the estimated end-to-end latency variation of the new session exceeds its limit.

In step 714, if the estimated end-to-end latency variation of the new session exceeds its limit, rejecting the request.

And in step 716, if the estimated end-to-end latency variation of the new session does not exceeds its limit, admitting the request.

In one embodiment, the method further comprises:

Receiving the capabilities of the destination of an existing session. The existing session is established over an existing path.

Allocating for the existing session a limit for its end-to-end latency variation, based on the capabilities of the destination of the existing session. In one example, the limit may have been allocated during the admission of the existing session.

Receiving a request to establish a new session over a new path, in presence of the session. The new path and the existing path are passing through the same output port of the same switch.

Estimating, before the new session is established, the end-to-end latency variation of the existing session, supposing the new session is established over the new path.

Comparing the estimated end-to-end latency variation with its limit.

Determining whether the estimated end-to-end latency variation exceeds its limit.

If the estimated end-to-end latency variation exceeds its limit, rejecting the request to establish the new session; and otherwise admitting the request.

In one example, the method comprises:

Receiving the capabilities of the first and second destination of first and second existing session.

Allocating for the first and existing session first and second limits for their end-to-end latency variations, based on the capabilities of the first and second destinations of the first and second existing sessions, respectively.

Receiving a request to establish a new session over a new path, in presence of the first and second existing sessions.

Estimating, before the new session is established, the first and second end-to-end latency variations of the first and second existing sessions, supposing the new session is established over the new path.

Comparing the estimated first and second end-to-end latency variations of the first and second existing sessions with their limits.

Determining whether at least one of the estimated first and second end-to-end latency variations exceeds its limit.

If at least one of the estimated first and second end-to-end latency variations exceeds its limit, rejecting the request to establish the new session; and otherwise admitting the request.

In one example, first and second sessions exit from first and second switches via first and second output ports, travel over first and second links, and enter a third switch via first and second input ports, respectively; and the first and second sessions further exit from the third switch via a third output port, travel over a third link, and enter a fourth switch. In one embodiment, the method further comprises receiving first and second maximum burst sizes of the first and second session at the first and second input ports, and calculating the local latency variation of the first session at the third output port, based on the first and second maximum burst sizes.

In one embodiment, the method further comprises calculating the first maximum burst size by multiplying the first latency variation by the capacity of the first link, and adding the maximum burst size of the first session at its source.

Figure 8:
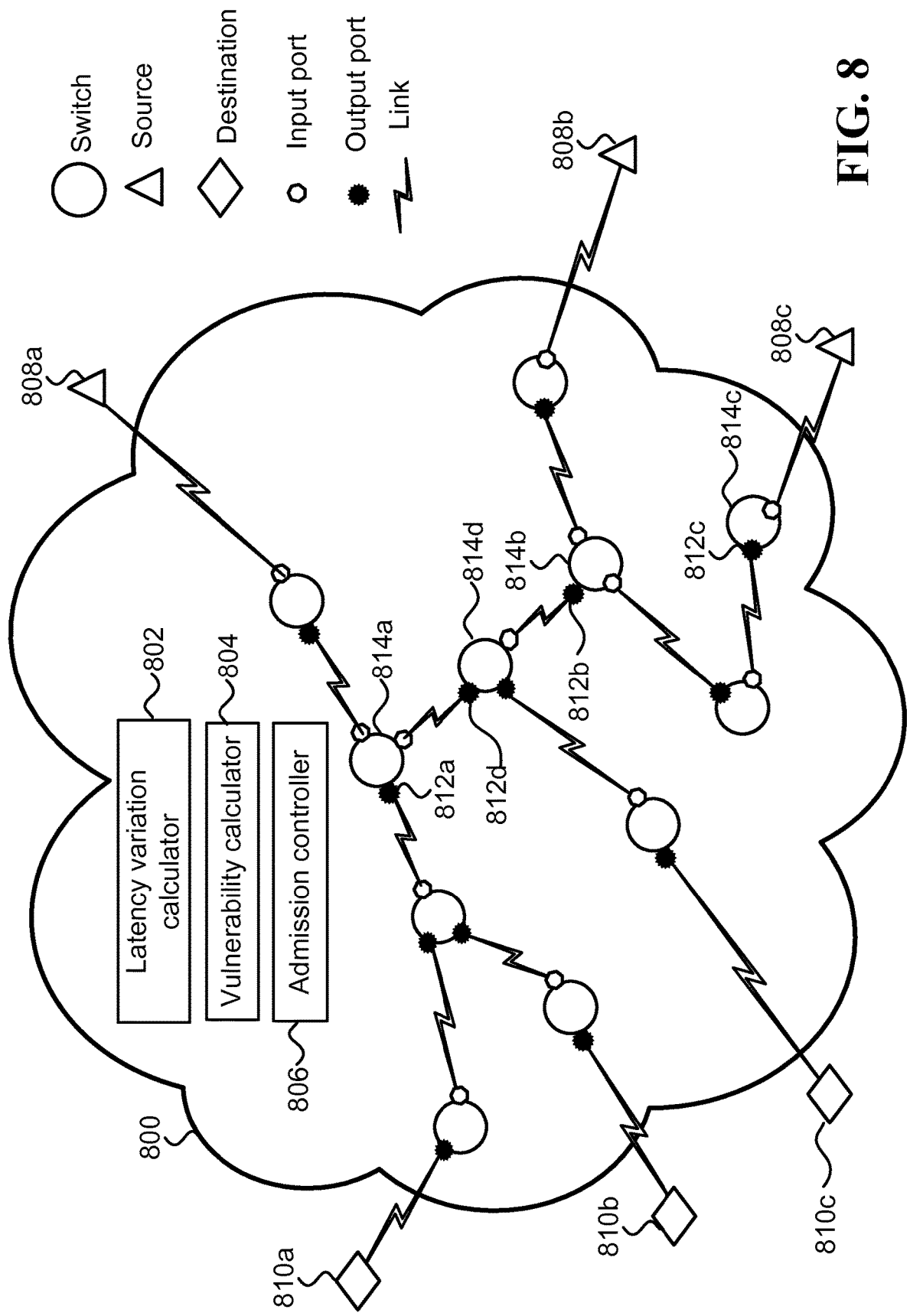
FIG. 8 illustrates one embodiment of a network, which indicates vulnerability of existing streaming sessions to new streaming sessions.

FIG. 8 illustrates one embodiment of a network 800, which indicates vulnerability of existing streaming sessions to new streaming sessions. The network maintains vulnerability indicators and utilizes them to avoid admission of new sessions, which might cause the end-to-end latency variations of existing sessions to exceed limits. The network may be the network 200 of FIG. 2, the network 400 of FIG. 4, the network 600 of FIG. 6, or other appropriate network.

The network 800 comprises a latency variation calculator 802, a vulnerability calculator 804, and an admission controller 806. The latency variation calculator 802 estimates the end-to-end latency variations of existing sessions established over the network. The vulnerability calculator 804, determines, based on the estimated end-to-end latency variation of the existing sessions, whether establishing a new session over a new path passing through a given output port of a given switch is liable to increase the end-to-end latency variation of an existing session above it limit. Based on those determinations, the vulnerability calculator maintains, at each output port of each switch, a vulnerability indicator associated with each session passing through the output port of the switch. The vulnerability indicator associated with a given session at a given output port indicates whether establishing a new session over a new path passing through the given output port is liable to increase the estimated end-to-end latency variation of the given session above its limit. The admission controller utilized the vulnerability indicators to avoid admission of new sessions, which are liable to cause the end-to-end latency variations of existing sessions to exceed their limit.

In one example, the existing sessions established over the network comprise first, second, and third existing sessions, starting at first, second, and third sources 808a, 808b, and 808c, respectively, and terminating first, second, and third destinations 810a, 810b, and 810c, respectively. The first and second existing sessions are passing through the first output port 812a of the first switch 814a; the second and third existing sessions are passing through the second output port 812b of the second switch 814b; and the third existing session is passing through the third output port 812c of the third switch 814c. The second existing session is passing through the second output port 812b before passing through the first output port 812a, and the third existing session is passing through the third output port 812c before passing through the second output port 812b.

The vulnerability calculator 804 determines a threshold for the end-to-end latency variation of the first existing session. The threshold is based on the limit associated with the end-to-end latency variation of the first existing session, for example the limit of the end-to-end latency variation of the first existing session, minus a predetermined margin.

The latency variation calculator estimates the end-to-end latency variation of a first existing session, and the vulnerability calculator compares the estimated end-to-end latency variation of the first existing session with its threshold. If the estimated end-to-end latency variation is higher than the threshold, increasing the local-latency variation of the first existing session at the first output port is liable to cause the end-to-end latency variation of the first existing session to exceed its limit. Therefore, if the estimated end-to-end latency variation is higher than the threshold, the vulnerability calculator sets the vulnerability indicator of the first existing session at the first output port to a first level, indicating that the first existing session is vulnerable to increasing its local latency variation at the first output port.

Furthermore, since the second existing session is passing through the second output port before passing through the first output port, increasing the local latency variation of the second existing session at the second output port is liable to increase the maximum burst size of the second existing session at the first switch, thereby increasing the local latency variation of the first existing session at the first output port. Consequently, increasing the local latency variation of the second existing session at the second output port is liable to cause the end-to-end latency variation of the first session to exceed its limit. Therefore, the vulnerability calculator further sets the vulnerability indicator of a second existing session at the second output port to a second level, indicating that the second existing session is vulnerable to increasing its local latency variation at the second output port.

In one example, the admission controller receives a request to establish a new session over a new path passing through the first output port. The admission controller rejects the request because the vulnerability indicator of the first existing session at the first output port is set to the first level. In one example, the admission controller receives a request to establish new session over a new path passing through the second output port. The admission controller rejects the request because the vulnerability indicator of the second existing session at the second output port is set to the second level.

In one example, the admission controller receives a request to establish a new session over a new path, which is passing through of one or more output ports of one or more switches. The admission controller receives the relevant vulnerability indicators, i.e., the vulnerability indicators of the existing sessions at the one or more output ports. If the admission controller identifies that one of the relevant vulnerability indicators is set to the first or the second level, it rejects the request to establish the new session; otherwise, it admits the request to establish the new session.

In one embodiment, the network further comprising a latency variation allocator, for example as explained above with reference to FIG. 6. In one embodiment, the latency variation allocator may determine the limit for the end-to-end latency variation of a session based on capabilities of the destination of the session.

In one embodiment, the vulnerability calculator propagates the vulnerability indicators over the path of existing session, in the reverse direction. For example, the vulnerability calculator sets the vulnerability level of the second existing session at the first output port 812a to the second vulnerability level, since the vulnerability indicator of the first existing session at the first output port 812a is set to the first vulnerability, and set the vulnerability level of the second existing session at the fourth output port 812d of the switch 814d, to the same level as the vulnerability level of the second existing session at the first output 812a.

In one embodiment, the vulnerability calculator may further set vulnerability indicators to a third level. The vulnerability calculator may set the vulnerability indicator of a given existing session at a given output port to the third level, since the given existing session is passing through the given output port before passing through another output port, and the vulnerability level of another existing session at the other output port is set to the second level. Similarly, in one embodiment, the vulnerability calculator may further set vulnerability indicators to a fourth level. The vulnerability calculator may set the vulnerability indicator of a given existing session at a given output port to a fourth level, since the given existing session is passing through the given output port before passing through another output port, and the vulnerability level of another existing session at the other output port is set to the third level.

In one example, the admission controller may reject a request to establish a new session passing through the given output port, based on the third level of the vulnerability indicator. In one example, the admission controller may reject a request to establish a new session passing through the given output port, based on the fourth level of the vulnerability indicator. In one example, the admission controller identifies that no one of the vulnerability indicators is set to any of the first, second, third, or fourth levels, and admits the request to establish the new session.

In one embodiment, the latency variation calculator is implemented in a distributed manner. The distributed latency variation calculator comprises local latency variation calculators, which are associated with the switches, where a local vulnerability calculator sets the vulnerability indicators at the output ports of the respective switch, based on vulnerability indicators set by other local vulnerability calculators. In one example, the vulnerability calculator comprises first and second local vulnerability calculators associated with the first and second output ports, respectively. The first local vulnerability calculator sets the vulnerability indicator of the first existing session to the first level, and set the vulnerability indicator of the second existing session at the first output port to the second level, based on the first level of the first vulnerability indicator of the first existing session at the first output port. The second local vulnerability calculator receives the value of the vulnerability indicator of the second existing session at the first output port, and set the vulnerability indicator of the second existing session at the second output port to be equal to the vulnerability indicator of the second existing session at the first output port.

In one embodiment, the vulnerability calculator is implemented in a centralized manner, and is comprised in a single node of the network, which may be a switch, or another node, for example a central controller of the network.

Figure 9:
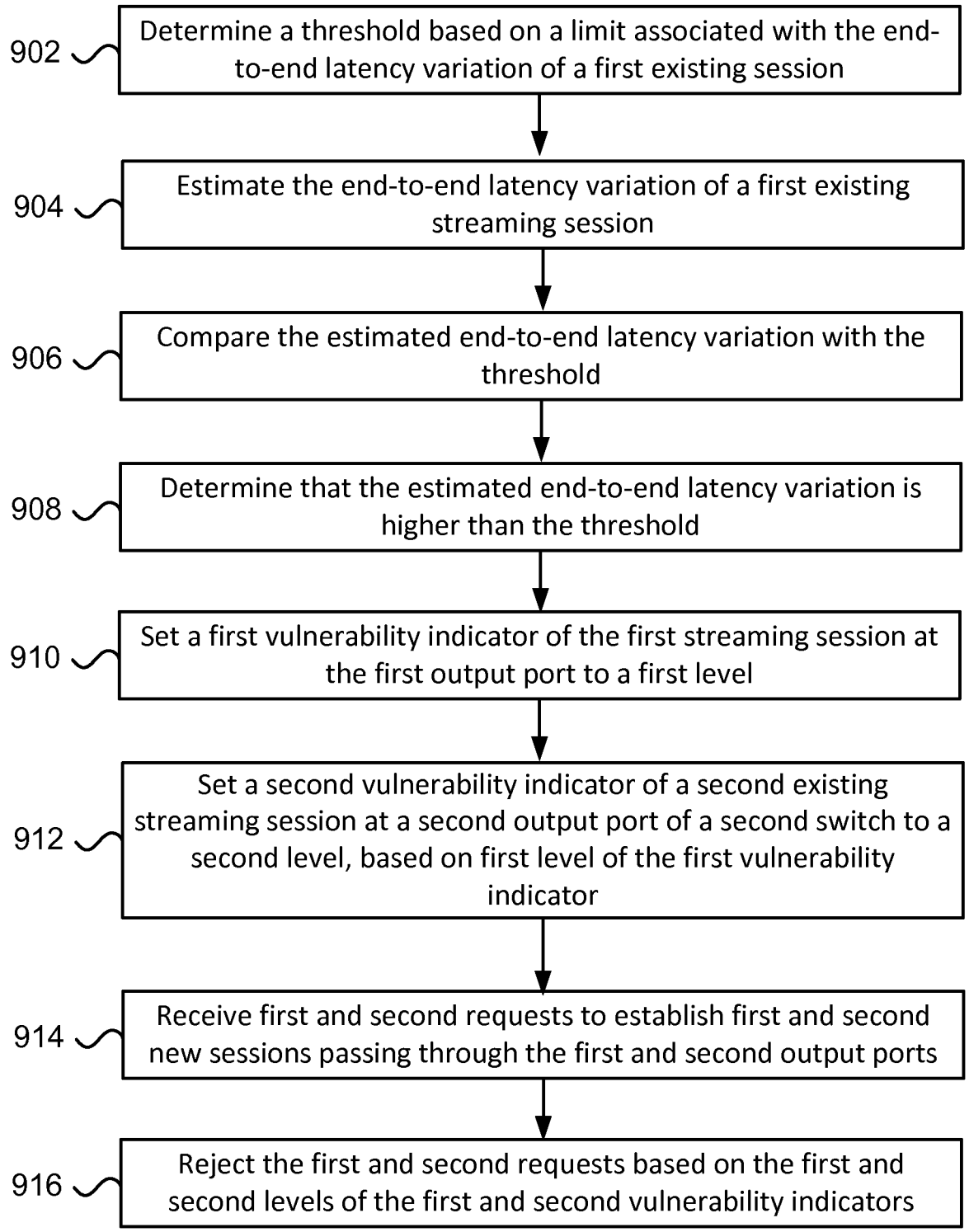
FIG. 9 illustrates one embodiment of a method for indicating vulnerability of existing streaming sessions to additional latency variations due to new streaming sessions.

FIG. 9 illustrates one embodiment of a method for indicating vulnerability of existing streaming sessions to additional latency variations due to new streaming sessions. The method may be performed by the network 800 of FIG. 8, or by any other suitable device. The method includes at least the following steps:

In step 902, determining, for a first existing session, a threshold, based on a limit associated with the end-to-end latency variation of the first existing session. The threshold may be equal to the limit minus a predetermined margin. The first existing session is established over a first existing path passing through a first output port of a first switch.

In step 904, estimating the end-to-end latency variation of a first existing session.

In step 906, comparing the estimated end-to-end latency variation with the threshold.

In step 908, determination that the estimated end-to-end latency variation is higher than the threshold.

In step 910, setting a first vulnerability indicator of the first session at the first output port to a first level, based on the determination in step 908.

In step 912, setting a second vulnerability indicator of a second existing session at a second output port of a second switch to a second level, based on first level of the first vulnerability indicator. The second existing session is established over a second existing path passing through the second output port before passing through the first output port.

In step 914, receiving first and second requests to establish first and second new sessions over first and second new paths passing through the first and second output ports, respectively.

And in a step 916, rejecting the first and second requests based on the first and second levels of the first and second vulnerability indicators, respectively.

In one embodiment, the limit for the end-to-end latency variation of a session may be determined based on the capabilities of the destination of the session.

In one example, a certain vulnerability indicator of a certain session at a certain switch is set to a certain vulnerability indicator; and the certain session is established over a certain path passing through a second certain output port of a second certain switch before passing through the certain output port of the certain switch. The method may set a second certain vulnerability indicator of the certain session at the second certain output port to the certain level, based on the certain level of the certain vulnerability indicator at the certain output port.

In one example, the method further comprises receiving a third request to establish a third new session over a third new path, which is passing through one or more third output ports of one or more third switches. The method may receive third vulnerability indicators of the third session at the third output ports, respectively, and admit the third session based on identifying that no one of the third vulnerability indicators is set to any of the first and second levels.

In one example, a third existing session is passing through a third output port of a third switch before passing through the second output port. The method may set a third vulnerability indicator of the third session at the third output port to a third level based on the second level of the second vulnerability indicator, receive a third request to establish a third new session over a third path passing through the third output port, and reject the third request based on the third level of the third vulnerability indicator.

In one example, the method receives a fourth request to establish a fourth new session over a fourth new path, which is passing through one or more fourth output ports of one or more fourth switches. The method may receive fourth vulnerability indicators of the fourth session at the fourth output ports, and admitting the fourth session based on identifying that no one of the fourth vulnerability indicators is set to any of the first, second, and third levels.

In one example, a fourth existing session is passing through a fourth output port of a fourth switch before passing through the third output port. The method may set a fourth vulnerability indicator of the fourth session at the fourth output port to a fourth level based on the third level of the third vulnerability indicator, receive a fourth request to establish a fourth new sessions over a fourth path passing through the fourth output port, and reject the fourth request based on the fourth level of the fourth vulnerability indicator.

In one example, the method receives a fifth request to establish a fifth new session over a fifth new path, which is passing through one or more fifth output ports of one or more fifth switches. The method may receive fifth vulnerability indicators of the fifth session at the fifth output ports, and admit the fifth session based on identifying that no one of the fifth vulnerability indicators is set to any of the first, second, third, and fourth levels.

Figure 10:
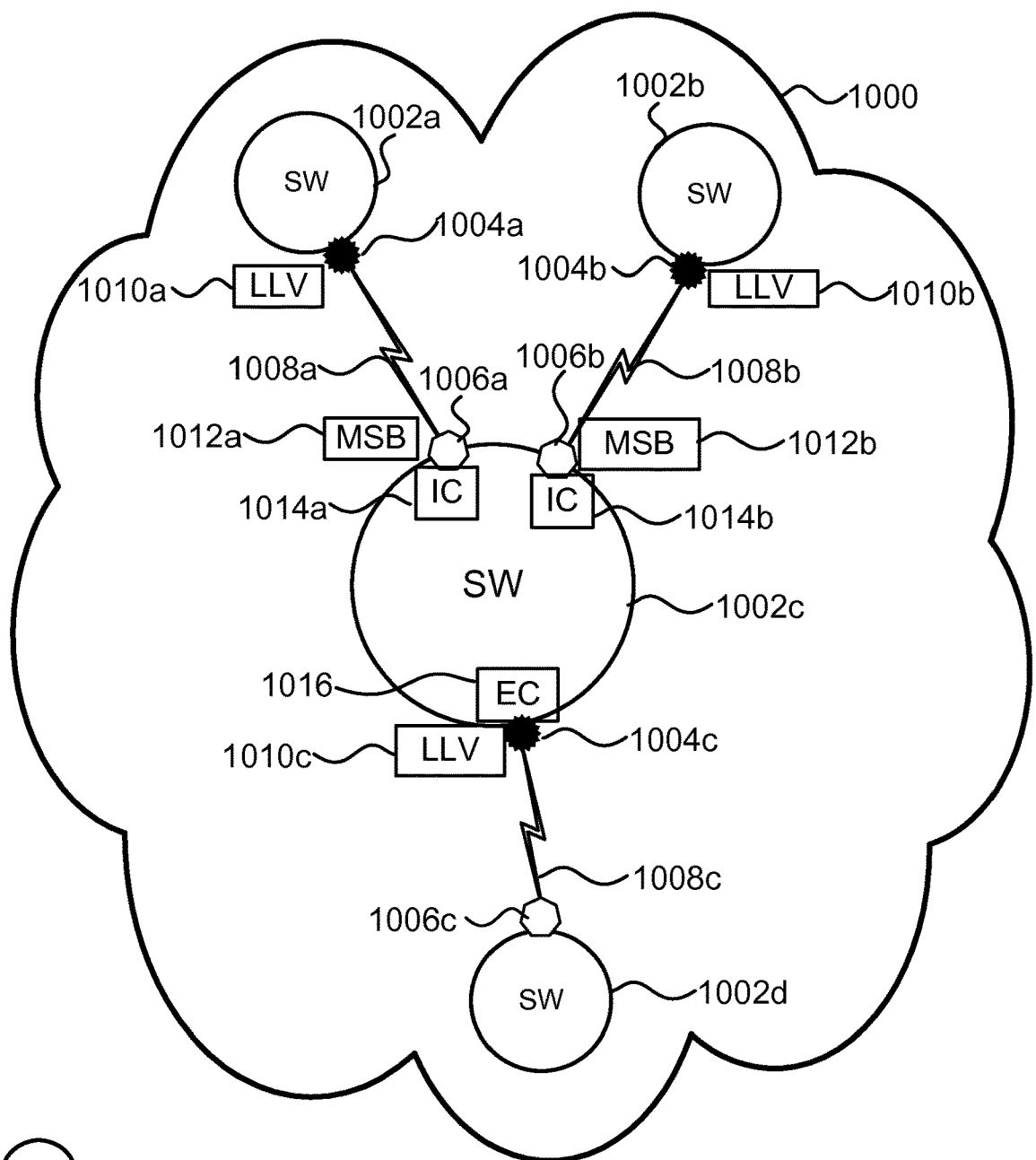
FIG. 10 illustrates one embodiment of network calculating latency variations in a distributed manner.

FIG. 10 illustrates one embodiment of a network 1000 calculating latency variations in a distributed manner. The network may be the network 200 of FIG. 2, the network 600 of FIG. 6, the network 800 of FIG. 8, or another suitable network.

In one example, the network comprises first, second, third, and fourth switches 1002a, 1002b, 1002c, and 1002d, respectively. The first, second and third switches comprise first, second, and third output ports 1004a, 1004b, and 1004c, respectively; and the second, third, and fourth switches comprise first, second, and third input ports 1006a, 1006b, and 1006c, respectively. The first, second, and third output ports are coupled to the first, second, and third input ports by a first, second, and third links 1008a, 1008b, and 1008c, respectively. In some cases, the ports are HDBaseT ports.

First and second sessions are established (or requested to be established) over the network. The first session is passing from the first switch to the third switch via the first output port 1002a, the first link 1008a, and the first input port 1006a; the second session is passing from the second switch to the third switch via the second output port 1002b, the second link 1008b, and the second input port 1006b; and both the first and second sessions are passing from the third switch to the fourth switch via the third output port 1002c, the third link 1008c, and the third input port 1006c.

The first and second switches and calculate the local latency variations 1010a and 1010b of first and second sessions at the first and second output ports, respectively. The third switch receives the calculated first and second local latency variations 1010a and 1010b from the first and second switches, and calculates the local latency variation 1010c of the first session at the third output port, based on the calculated first and second local latency variations.

The sessions may be sessions already established, and/or new sessions requested to be established. For example, the local latency variation calculator may calculate: the local latency variation of an existing session in presence of another existing session, the local latency variation of an existing session in presence of a new session, supposing the new session is established, and/or the local latency variation of a new session in presence of an existing session, supposing the new session is established.

In one embodiment, the third switch calculates first and second maximum burst sizes 1012a and 1012b of the first and second sessions at the first and second input ports, respectively. The first and second maximum burst sizes 1012a and 1012b are calculated based on the first and second local latency variations 1010a and 1010b, respectively, received from the first and second switches, respectively. Based on the first and second maximum burst sizes 1012a and 1012b, the third switch calculates the third local latency variation 1010c.

In one embodiment, the third switch comprises a local latency variation calculator, which comprises first and second ingress calculators 1014a and 1014b, and an egress calculator 1016. The first and second ingress calculators 1014a and 1014b are associated with the first and second input ports, respectively; and the egress calculator 1016 is associated with the third output port. The first and second ingress calculators receive the first and second local latency variations 1010a and 1010b, and calculate the first and second maximum burst sizes 1012a and 1012b based on the first and second local latency variations, respectively. The egress calculator 1016 receives the first and second maximum burst sizes 1012a and 1012b, and calculates the third local latency variation 1010c, based on the first and second maximum burst sizes 1012a and 1012b.

It is noted that the above example is not limiting, and the switches may comprise more input ports and/or more output ports. For example, the third switch may comprise three or more input ports and three or more ingress calculators associated therewith, and the egress calculator may calculate the local latency variation based on maximum burst sizes of three or more input ports.

Figure 11:
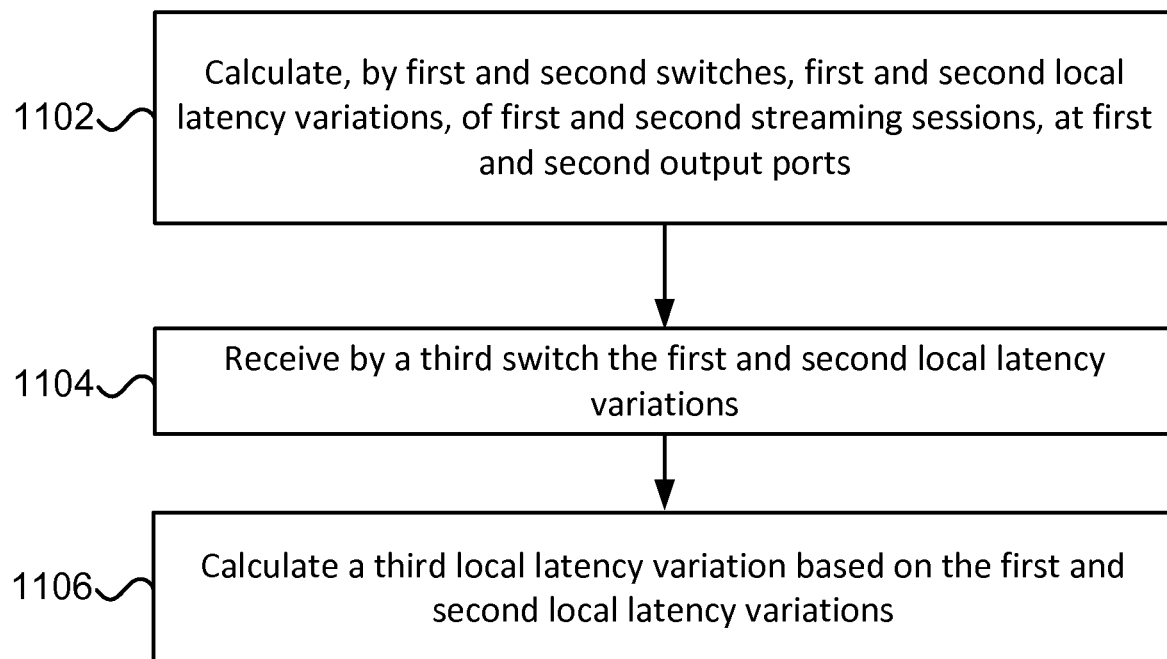
FIG. 11 illustrates one embodiment of a method for calculating latency variations in a distributed manner.

FIG. 11 illustrates one embodiment of a method for calculating latency variations in a distributed manner. The method includes at least the following steps:

In step 1102, calculating, by first and second switches, first and second local latency variations, of first and second sessions, at first and second output ports of the first and second switches, respectively.

In step 1104, receiving, by the third switch, the first and second local latency variations. The first and second sessions are passing through a third output port of the third switch after passing through the first and second output ports. In some cases, the ports are HDBaseT ports.

And in step 1106, calculating, by the third switch, a third local latency variation of the first session at the third output port, based on the first and second local latency variations.

The method may be performed by the network 1000 in FIG. 10 or by other suitable network. Step 1102 may be performed by the first and second switches 1002a and 1002b in FIG. 1000, by other switches, or by other suitable devices. Steps 1104 and 1106 may be performed by the third switch 1002c in FIG. 1000, by another switch, or by another suitable device. The ports may be HDBaseT ports.

The sessions may be sessions already established, and/or new sessions requested to be established. For example, the method may comprise calculating the local latency variation of an existing session in presence of another existing session, calculating the local latency variation of an existing session in presence of a new session, supposing the new session is established, and/or calculating the local latency variation of a new session in presence of an existing session, supposing the new session is established.

In one example, the first and second output ports are coupled to first and second input ports of the third switch. In one embodiment, the method further comprises calculating first and second maximum burst sizes of the first and second sessions at the first and second input ports, based on the first and second local latency variations, respectively, and the third local latency variation is calculated based on the first and second maximum burst sizes.

It is noted that the above example is not limiting, and the method may comprise calculating the local latency variation of a certain output port based on latency variations of three or more output ports.

Figure 12:
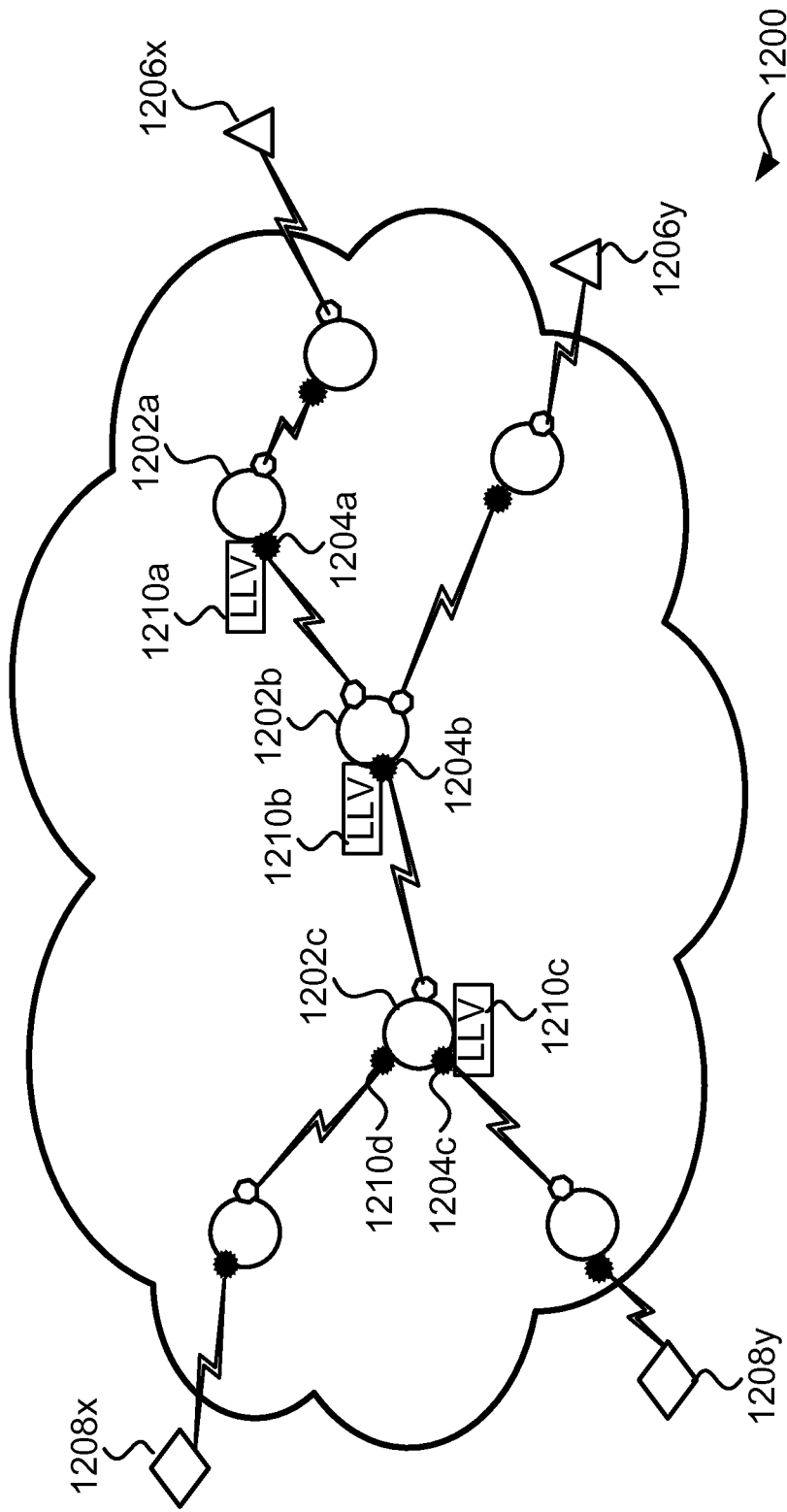
FIG. 12 illustrates one embodiment of a network calculating local latency variations in an incremental manner.

FIG. 12 illustrates one embodiment of a network 1200 calculating local latency variations in an incremental manner. When a session is changed (e.g., admitted or terminated) the network 1200 identifies potentially affected sessions, which may potentially be affected by the change, and potentially affected output ports, where the potential affect may occur. The network updates the local latency variations of the potentially affected sessions at the potentially affected output port, while maintaining other local latency variations unchanged. The network may be the network 200 of FIG. 2, the network 600 of FIG. 6, the network 800 of FIG. 8, the network 1000 of FIG. 10, or another suitable network.

In one example, the network comprises first, second, and third switches 1202a, 1202b, and 1202c, respectively. The first and second switches comprise first and second output ports 1204a and 1204b, respectively; and third switch comprises third and fourth output ports 1204c and 1204d. First and second sources 1206x and 1206y, and first and second destinations 1208x and 1208y, are coupled to the network. First and second sessions are established over the network, the first session from the first source 1206x to the first destination 1208x, and the second session from the second source 1206y to the second destination 1208y. The first session is passing through the first, second and third output ports 1204a, 1204b, and 1204c, and the second session is passing through the second and fourth ports 1004b and 1204d. The first session is passing through the first output port 1204a before passing through the second output port 1204b. In some embodiments, the ports are HDBaseT ports.

In one embodiment, the network may comprise a latency variation calculator. In one embodiment, the latency variation calculator may be implemented in a distributed manner. For example, the latency calculator may comprise local latency calculators associated with the switches. A local latency variation calculator, which is associated with a switch, may reside at the proximity of the switch. The local latency calculator may be directly coupled to the switch, or may be incorporated within the switch.

In one embodiment, the first local latency variation calculator associated with the first switch 1202a updates the first local latency variation 1210a of the first session at the first output port 1204a. In one example, the update may be a result of admission or termination of a third session, which affects the local latency variation of the first session at the first output port. The second local latency variation calculator associated with the second switch 1202b receives an indication that the local latency variation 1210a of the first session at the first output port was updated, and identify the potential effect of this update on the local latency variation 1210b of the second session at the second output port 1204b, because the first session is passing through the second output port after passing through the first output port. The second local latency variation calculator updates the local latency variation 1210b, where the updated local latency variation 1210b is calculated based on the updated local latency variation 1210a.

It is noted that the example described above may is not limiting. In some cases, the network mat comprise further switches, and further local latency variations of further session at further output port may be updated based on previously updated local latency variations.

In one embodiment, the latency variation calculator receives an indication that the local latency variation 1210a of the first session at the first output port was updated, and identify that this update does not directly affect the local latency variation 1210c of the second session at the third output port 1204c, because the first session is not passing through the third output port after passing through the first output port. Base on this identification, the latency variation calculator maintains the local latency variation 1210c of the second session at the third output port 1204c unchanged, although the local latency variation 1210a of the first session at the first output port was updated.

In some embodiments, the latency variation calculator calculates a difference between the updated local latency variation and the previous value of the local latency variation, and performs further updates only if the difference exceeds a threshold, thereby eliminating small, immaterial updates.

In an example, the first session it terminated, in presence of the second session. The latency variation calculator receives an indication that the first session was terminated, identifies the potential effect of the termination on the local latency variation 1210b of the second session at the second output port, and updates the local latency variation 1210b.

In an example, the first session is established in the presence of the second session. The latency variation calculator receives an indication that the first session was established, identifies the potential effect of the new local latency variation 1210a of the first session at the first output port on the local latency variation 1210b of the second session at the second output port, and updates the local latency variation 1210b.

Figure 13:
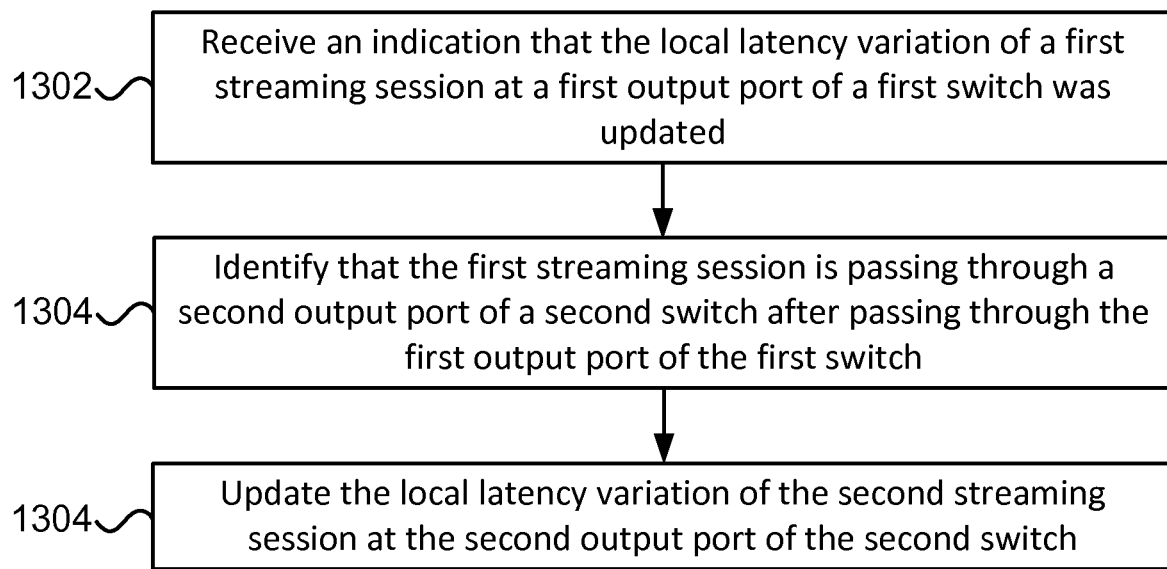
FIG. 13 illustrates one embodiment of a method for calculating local latency variations in an incremental manner.

FIG. 13 illustrates one embodiment of a method for calculating local latency variations in an incremental manner. The method may be performed by the network 200 of FIG. 2, by the network 600 of FIG. 6, by the network 800 of FIG. 8, by the network 1000 of FIG. 10, by the network 1200 of FIG. 12, or by another suitable network. The method includes at least the following steps:

In step 1302, updating the local latency variation of a first session at a first output port of a first switch was updated. The first session is passing through a second output port of a second switch after passing through the first output port of the first switch. In some embodiments, the ports may be HDBaseT ports.

In step 1304, identifying a relationship that the first session is passing through the second output port of the second switch after passing through the first output port of the first switch.

And in step 1306, updating the local latency variation of the second session at the second output port, based on the relationship. The updated second local latency variation is calculated based on the updated first local latency variation.

In an embodiment, the method further comprises: identifying a second relationship that the second streaming session is passing through a third output port of a third switch after passing through the second output port, wherein a third streaming session is passing through the third output port; and updating a third local latency variation of the third streaming session at the third output port, based on the second relationship.

In one example, the local latency variation of the first session at the first output port is updated, a second session is passing through a second output port of a second switch, and the first session is not passing through the second output port of the second switch after passing through the first output port of the first switch. The method further comprises identifying a relationship that the first session is not passing through the second output port after passing through the first output port, and maintaining the local latency variation of the second session at the second output port unchanged, based on the relationship.

In some embodiments, the difference between the updated local latency variation and the previous value of the local latency variation is calculated, and further updates are performed only if the difference exceeds a threshold, thereby eliminating small, immaterial updates.

In one example, a first session it terminated, in presence of a second session, the first and the second session passing through the same output port of a same switch. The method further comprises receiving an indication that the first session was terminated, and updating the local latency variation of the second session at the output port.

In an example, a first session is established in the presence of a second session, the second session is passing through a second output port of a second switch, and the first session is passing through the second output port of the second switch after passing through a first output port of a first switch. The method further comprises: receiving a second indication that a first session was established, identifying that the first session is passing through the second output after passing through the first output port, and updating the local latency variation of the second session at the second output port, based on the indication and the identifying.

Figure 14:
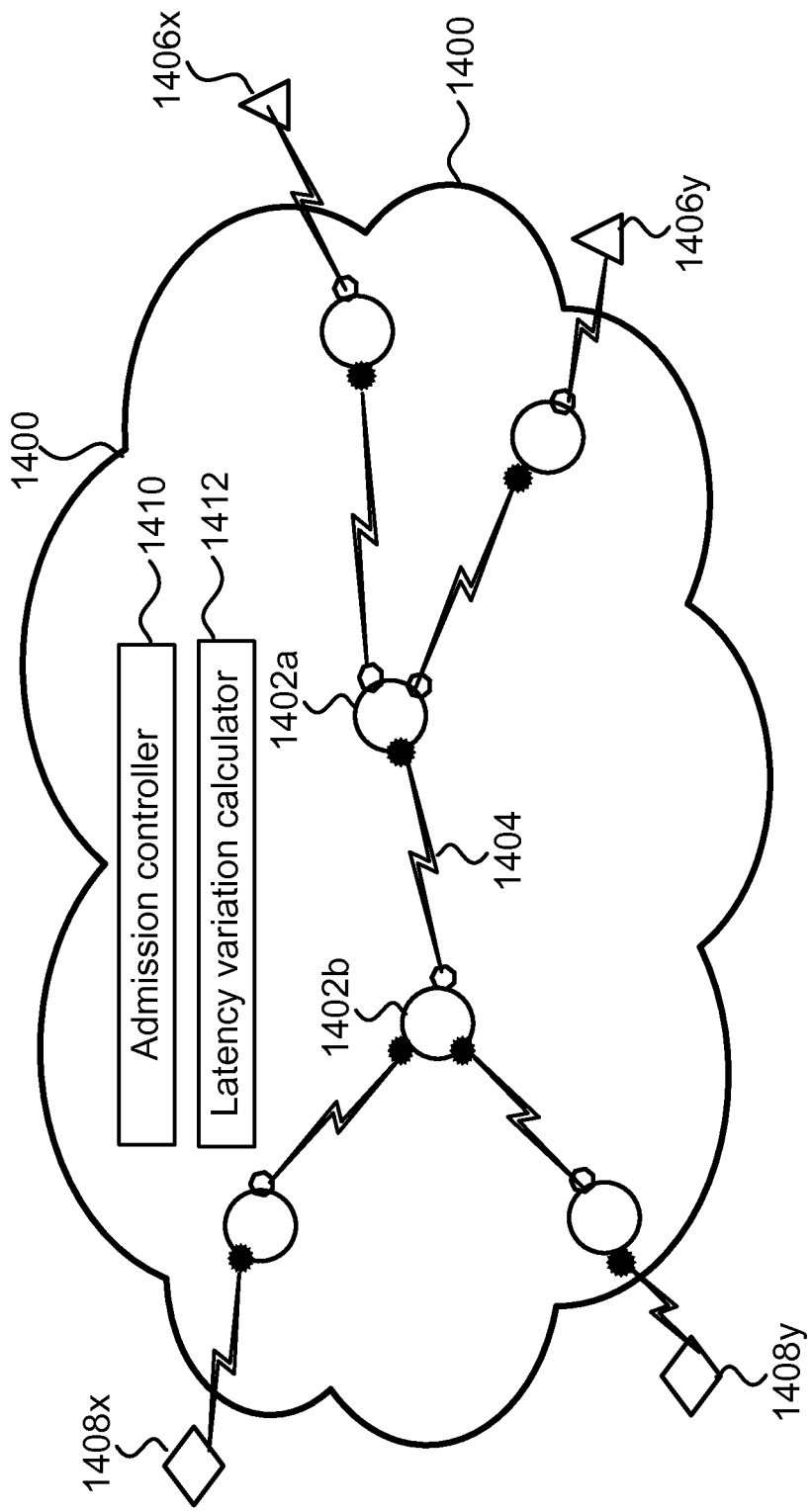
FIG. 14 illustrates one embodiment of a network, which admits streaming sessions while controlling capacities of the links.

FIG. 14 illustrates one embodiment of a network 1400, which admits streaming sessions while controlling capacities of the links. The network 1400 may be the network 200 of FIG. 2, the network 600 of FIG. 6, the network 800 of FIG. 8, the network 1000 of FIG. 10, the network 1200 of FIG. 12, or another suitable network.

In one example, the network 1400 comprises first and second switches 1402a and 1402b, coupled by a link 1404. The link may be an HDBaseT link, or any other link appropriate to the case. The link can be set to a first capacity, and can further be set to a second capacity, higher than the first capacity. The first and second capacities may also be referred to as the lower capacity and the higher capacity, respectively. The different capacities of the link may be obtained by utilizing different signaling rates, by utilizing different signaling sets, e.g., different constellations, and/or by other suitable techniques.

First and second sources, 1406x and 1406y, and first and second destinations, 1408x and 1408y, are coupled to the network. An existing session, passing from the first source 1406x to the first destination 1408x, is established over the network. The existing session is associated with a limit for its end-to-end latency variation. The path of the existing session is passing through the link 1404, which is currently set to have the first (lower) capacity.

The network comprises an admission controller 1410, and a latency variation calculator 1412.

The admission controller receives a request to establish a new session over a new path, from the second source 1406y to the second destination 1408y, and the new path is passing through the link 1404. The new session is associated with a second limit for its end-to-end latency variation.

The latency variation calculator estimates, before the new session is established, the end-to-end latency variations of the existing session, supposing that the new session is established over the new path, and the link is set to remain in the current lower capacity. The admission controller compares the estimated end-to-end latency variations with the limit associated with the end-to-end latency variation of the existing session. If the admission controller determines that the estimated end-to-end latency variation does not exceed the limit, the admission controller leaves the link to remain at the current lower capacity, and admits the request to establish the new session.

Otherwise, the latency variation calculator estimates, before the new session is established, the end-to-end latency variations of the existing session, supposing that the new session is established over the new path, and the capacity of the link is increased to the higher capacity. It is appreciated that, in some cases, increasing the link capacity may reduce the local latency variation, since it reduces the time that certain packets need to wait until other packets are transmitted over the link. The admission controller compares the estimated end-to-end latency variations with the limit associated with the end-to-end latency variation of the existing session. If the admission controller determines that the end-to-end latency variation does not exceed the limit, the admission controller set the link to have the higher capacity, and admits the request to establish the new session.

Otherwise, the admission controller leaves the link at the current lower capacity, and rejects the request to establish the new session.

In some embodiments, the limits for the end-to-end latency variations may be determined by a latency variation allocator. In some embodiments, the latency variation allocator may receive capabilities of a destination of a session, and determine a limit for the end-to-end latency variation thereof based on the capabilities. In some cases, the capabilities of the destination may comprise the buffer size of the destination.

In one example, the first and second sessions are passing through the link 1404, which is set to have the higher capacity, and the second session is terminated. The admission controller receives a request to terminate the second session, or an indication that the second session was terminated. The latency variation calculator estimates the end-to-end latency variation of the first session supposing that the second existing session is terminated, and further supposing that the link is reduced to the lower capacity. The admission controller compares the estimated end-to-end latency variation with the limit associated with the end-to-end latency variation of the first session. If the estimated latency variation does not exceed the limit, the admission controller set the link to have the lower capacity, otherwise it leaves the link to have the higher capacity.

In one example, an existing session, passing from the first source to the first destination, is established over the network, and the path of the existing session is passing through the link 1404, which is currently set to have the lower capacity. The admission controller receives a request to establish a new session over a new path, from the second source to the second destination. The new session is associated with a limit for its end-to-end latency variation, and the path of the new session is passing through the link 1404.

The latency variation calculator estimates, before the new session is established, the end-to-end latency variations of the new session, supposing that the new session is established over the new path, and the link is set to remain in the current lower capacity. The admission controller compares the estimated end-to-end latency variations with the limit associated with the end-to-end latency variation of the new session. If the admission controller determines that the estimated end-to-end latency variation does not exceed the limit, the admission controller leaves the link to have the current lower capacity, and admits the request to establish the new session.

Otherwise, the latency variation calculator estimates, before the new session is established, the end-to-end latency variations of the new session, supposing that the new session is established over the new path, and the link is set to the higher capacity. The admission controller compares the estimated end-to-end latency variations with the limit associated with the end-to-end latency variation of the new session. If the admission controller determines that the end-to-end latency variation does not exceed the limit, the admission controller set the link to have the higher capacity, and admits the request to establish the new session.

Otherwise, the admission controller leaves the link to have the current lower capacity, and rejects the request to establish the new session.

Figure 15:
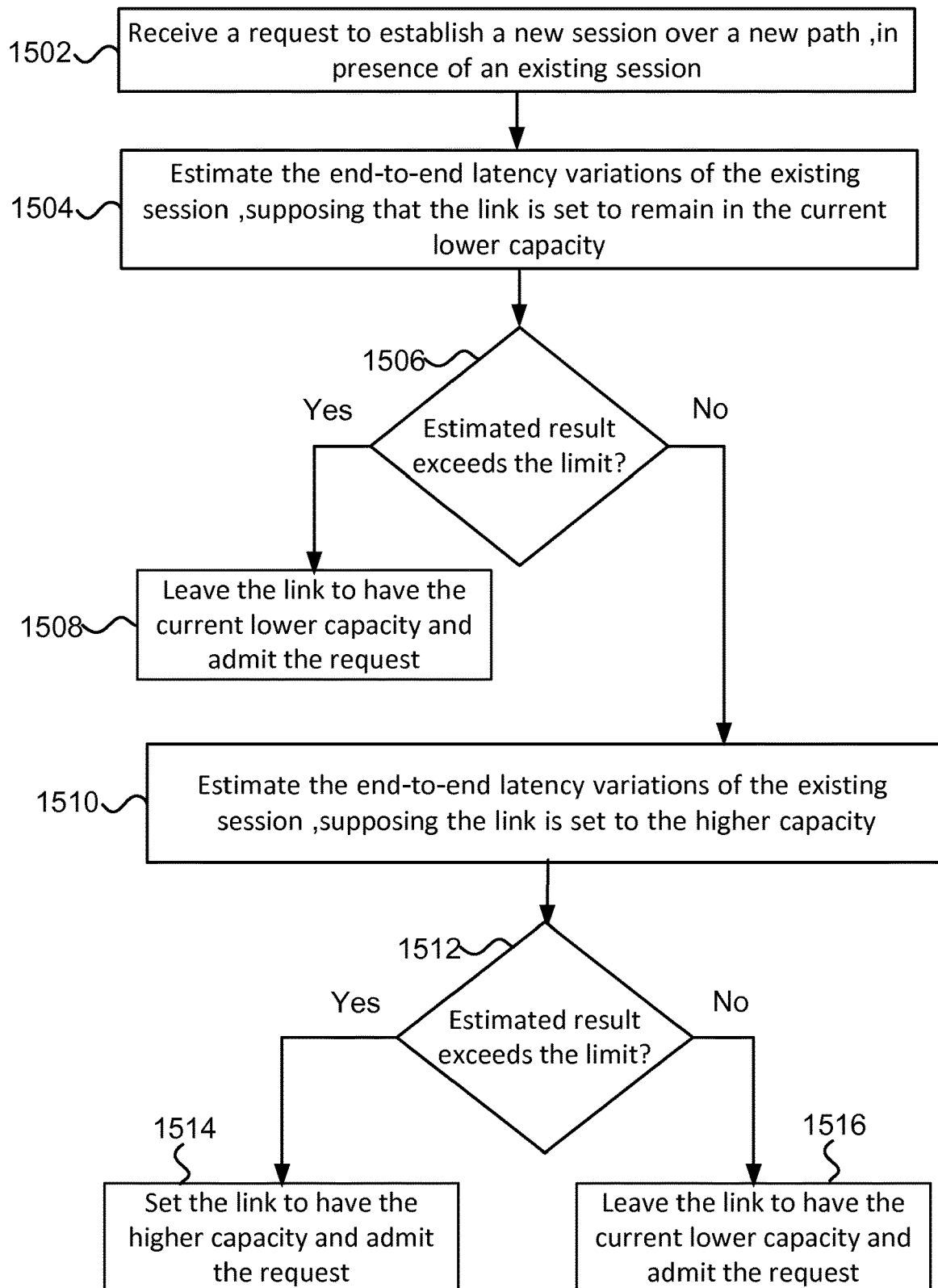
FIG. 15 illustrates one embodiment of a method for admitting streaming sessions while controlling capacities of the links.

FIG. 15 illustrates one embodiment of a method for admitting streaming sessions while controlling capacities of the links. The method may be performed by the network 200 of FIG. 2, by the network 600 of FIG. 6, by the network 800 of FIG. 8, by the network 1000 of FIG. 10, by the network 1200 of FIG. 12, by the network 1400 of FIG. 14, or by another suitable network. The method includes at least the following steps:

In step 1502, receiving a request to establish a new session over a new path, in presence of an existing session, which is established over an existing path. The existing session is associated with a limit for its end-to-end latency variation. The new path and the existing path are passing through a link, which may be an HDBaseT link, or any other link applicable for the case. The link can be set to a first capacity, and can further be set to a second capacity, higher than the first capacity. The link is currently set to have a lower capacity. The new session is associated with a second limit for its end-to-end latency variation.

In step 1504, estimating, before the new session is established, the end-to-end latency variations of the existing session, supposing that the new session is established over the new path, and further supposing that the link is set to remain in the current lower capacity. This result is referred to as the first estimation result.

In step 1506, comparing the first estimation result with the limit associated with the end-to-end latency variation of the existing session, and determining whether the first estimation result exceeds the limit.

In step 1508, if the first estimation result does not exceed the limit, leaving the link to have the current lower capacity, and admitting the request to establish the new session.

Otherwise, in step 1510, estimating, before the new session is established, the end-to-end latency variations of the existing session, supposing that the new session is established over the new path, and the link is set to the higher capacity. This result is referred to as the second estimation result.

In step 1512, comparing the second estimation result with the limit associated with the end-to-end latency variation of the existing session, and determining whether the second estimation result exceeds the limit.

In step 1514, if the second estimation result exceeds the limit, setting the link to have the higher capacity, and admitting the request to establish the new session.

Otherwise, in step 1516, leaving the link to have the current lower capacity, and rejecting the request to establish the new session.

wherein the link is an HDBaseT link.

In some embodiments, the limits for the end-to-end latency variation of a session may be determined based capabilities of a destination of the session. In some cases, the capabilities of the destination may comprise the buffer size of the destination.

In one example, first and second sessions are passing through a link, and the second session is terminated. The link can be set to a first capacity, and can further be set to a second capacity, higher than the first capacity. The link is currently set to have a lower capacity. The method may further comprise:

Receiving a request to terminate the second session, or an indication that the second session was terminated.

Estimating the end-to-end latency variation of the first session supposing that the second existing session is terminated, and further supposing that the link is set to have the lower capacity.

Comparing the estimated end-to-end latency variation with the limit associated with the end-to-end latency variation of the first session.

If the estimated latency variation does not exceed the limit, setting the link to have the lower capacity, otherwise it leaves the link to have the higher capacity.

In one example, an existing session is established over the network, and the path of the existing session is passing through a link that is currently set to have the lower capacity.

The method may further comprise:

Receiving a request to establish a new session over a new path. The new session is associated with a limit for its end-to-end latency variation, and the new path is passing through the link.

Estimating, before the new session is established, the end-to-end latency variations of the new session, supposing that the new session is established over the new path, and the link is set to remain in the current lower capacity. This result is referred to as the first estimation result.

Comparing the first estimation result with the limit associated with the end-to-end latency variation of the new session, and determining whether it exceeds the limit.

If the first estimation result does not exceed the limit, leaving the link to have the current lower capacity, and admitting the request to establish the new session.

Otherwise, estimating, before the new session is established, the end-to-end latency variations of the new session, supposing that the new session is established over the new path, and the link is set to the higher capacity. This result is referred to as the second estimation result.

Comparing the second estimation result with the limit associated with the end-to-end latency variation of the new session.

If the second estimation result does not exceed the limit, setting the link to have the higher capacity, and admitting the request to establish the new session.

Otherwise, leaving the link to have the current lower capacity, and rejecting the request to establish the new session.

Herein, a predetermined value, such as a predetermined confidence level or a predetermined threshold, is a fixed value and/or a value determined any time before performing a calculation that compares a certain value with the predetermined value. A value is also considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A network configured to admit streaming sessions based on capabilities of their destinations, comprising:
    a switch coupled to wired communication links;
    a processor configured to receive a request to establish a new streaming session over a new path, in presence of an existing streaming session; wherein the existing streaming session is established over an existing path, and the new path and the existing path pass through an output port of the switch and over at least some of the wired communication links;
    the processor is further configured to: receive capabilities of a destination of the new streaming session, and allocate a limit for a first allowable end-to-end latency variation of the new streaming session based on the capabilities;
    the processor is further configured to estimate, before the new streaming session is established, an estimated end-to-end latency variation of the new streaming session, as if the new streaming session is established over the new path; and
    the processor is further configured to: determine, by comparing the estimated end-to-end latency variation with the limit, a determination that the estimated end-to-end latency variation exceeds the limit, and reject the request based on the determination.

2. The network of claim 1, wherein the processor comprises a local processor associated with a switch coupled to the destination.

3. The network of claim 1, wherein the new streaming session operates according to definitions set in HDBaseT® standard.

4. The network of claim 1, wherein the capabilities of the destination comprises a buffer size thereof.

5. The network of claim 1, wherein the processor is further configured to receive a second request to establish a second new streaming session over a second new path, in presence of the existing streaming session; the second new path and the existing path pass through a second output port of a second switch; the processor is further configured to: receive second capabilities of a second destination of the second new streaming session, and allocate for the second new streaming session a second limit for a second allowable end-to-end latency variation thereof based on the second capabilities; the processor is further configured to estimate, before the second new streaming session is established, a second estimated end-to-end latency variation of the second new streaming session, as if it is established over the second path; the processor is further configured to: determining, based on comparing the second estimated end-to-end latency variation with the second limit, a second determination that the second estimated end-to-end latency variation does not exceeds the second limit, and admit the second request based on the second determination.

6. The network of claim 1, wherein the processor is further configured to: receive second capabilities of a second destination of a second existing streaming session, and allocate for the second existing streaming session a second limit for a second allowable end-to-end latency variation thereof, based on the second capabilities; the processor is further configured to: receive a second request to establish a second new streaming session over a second new path, in presence of the second streaming session; the second existing session is established over a second existing path, and the second new path and the second existing path pass through a second output port of a second switch; the processor is further configured to estimate, before the second new streaming session is established, an estimated second end-to-end latency variation of the second existing streaming session, as if the second new streaming session is established over the second new path; and the processor is further configured to: determine, based on comparing the second end-to-end latency variation with the second limit, a second determination that the second end-to-end latency variation exceeds the second limit, and reject the second request based on the second determination.

7. The network of claim 6, wherein the processor is further configured to receive a third request to establish a third new streaming session over a third new path, in presence of the second existing streaming session; the third new path and the second existing path pass through a third output port of a third switch; the processor is further configured to estimate, before the third new streaming session is established, a third estimated end-to-end latency variation of the second existing streaming session, as if the third new streaming session is established over the third path; and the processor is further configured to: determine, based on comparing the third estimated end-to-end latency variation with the limit, a third determination that the third estimated end-to-end latency variation does not exceed the limit, and admit the third request based on the third determination.

8. The network of claim 6, wherein the processor is further configured to: receive third capabilities of a third destination of a third existing streaming session, and allocate for the third existing streaming session a third limit for a third allowable end-to-end latency variation thereof based on the third capabilities; the processor is further configured to: receive a third request to establish a third new streaming session over a third new path, in presence of the second and third existing streaming sessions; the third existing session is established over a third existing path, the third new path and the second existing path pass through a third output port of a third switch, and the third new path and the third existing path pass through a fourth output port of a fourth switch; the processor is further configured to: estimate, before the third new streaming session is established, third and fourth estimated end-to-end latency variations of the second and third existing streaming sessions, respectively, as if the third new streaming session is established over the third new path; and the processor is further configured to: determine, based on comparing the third and fourth estimated end-to-end latency variations with the second and the third limits, respectively, a third determination that at least one of the third and fourth estimated end-to-end latency variations exceeds the respective one of the second and third limits, and reject the third request based on the third determination.

9. The network of claim 8, wherein the processor is further configured to: receive a fourth request to establish a fourth new streaming session over a fourth new path, in presence of the second and third existing streaming sessions; the fourth new path and the second existing path pass through a fifth output port of a fifth switch, and the fourth new path and the third existing path pass through a sixed output port of a sixed switch; the processor is further configured to: estimate, before the fourth new streaming session is established, fifth and sixed estimated end-to-end latency variations of the second and third existing streaming sessions, respectively, as if the fourth new streaming session is established over the fourth new path; and the processor is further configured to: determine, based on comparing the fifth and sixed estimated end-to-end latency variations with the second and the third limits, respectively, a fourth determination that no one of the third and fourth estimated end-to-end latency variations exceeds the respective one of the second and third limits, and admit the fourth request based on the fourth determination.

10. The network of claim 1, wherein the processor is further configured to receive first and second maximum burst sizes of a certain streaming session and another streaming session at first and second input ports, respectively, of a certain switch; wherein the certain streaming session and the other streaming session pass through a certain output port of the certain switch; and the processor is further configured to calculate a calculated local latency variation of the certain streaming session at the certain output port, based on the first and second maximum burst sizes.

11. The network of claim 10, wherein the processor is further configured to: receive a local latency variation of the certain streaming sessions at another output port of another switch, and calculate the maximum burst size of the certain streaming session at the first input port of the certain switch based on the local latency variation; wherein the other output port is coupled to the first input port by a communication link selected from the communication links.

12. A method for establishing new streaming sessions based on capabilities of their destinations, comprising:
receiving, by a network comprising at least one switch and at least one processor, a request to establish a new streaming session over a new path, in presence of an existing streaming session; wherein the existing streaming session is established over an existing path, and the new path and the existing path pass through an output port of a switch;

receiving capabilities of a destination of the new streaming session;

allocating for the new streaming session a limit for an allowable end-to-end latency variation thereof, based on the capabilities;

estimating, before the new streaming session is established, an estimated end-to-end latency variation of the new streaming session, as if it is established over the new path;

determining, based on comparing the estimated end-to-end latency variation with the limit, a determination that the estimated end-to-end latency variation exceeds the limit; and rejecting the request, based on the determination.

13. The method of claim 12, wherein the new streaming session operates according to definitions set in HDBaseT® standard.

14. The method of claim 12, wherein the capabilities of the destination comprises a buffer size thereof.

15. The method of claim 12, further comprising receiving a second request to establish a second new streaming session over a second new path, in presence of the existing streaming session; wherein the second new path and the existing path pass through a second output port of a second switch; the method further comprises: receiving second capabilities of a second destination of the second new streaming session, allocating for the second new streaming session a second limit for a second allowable end-to-end latency variation thereof based on the second capabilities, and estimating, before the second new streaming session is established, a second estimated end-to-end latency variation of the second new streaming session, as if it is established over the second path; the method further comprises: determining, based on comparing the second estimated end-to-end latency variation with the second limit, a second determination that the second estimated end-to-end latency variation does not exceeds the second limit, and admitting the second request based on the second determination.

16. The method of claim 12, further comprising: receiving second capabilities of a second destination of a second existing streaming session, and allocating for the second existing streaming session a second limit for a second allowable end-to-end latency variation thereof based on the second capabilities; the method further comprises: receiving a second request to establish a second new streaming session over a second new path, in presence of the second streaming session; wherein the second existing session is established over a second existing path, and the second new path and the second existing path pass through a second output port of a second switch; the method further comprises: estimating, before the second new streaming session is established, a second estimated end-to-end latency variation of the second existing streaming session, as if the second new streaming session is established over the second new path; the method further comprises: determining, based on comparing the second estimated end-to-end latency variation with the second limit, a second determination that the second end-to-end latency variation exceeds the second limit, and rejecting the second request based on the second determination.

17. The method of claim 16, further comprising receiving a third request to establish a third new streaming session over a third new path, in presence of the second existing streaming session; wherein the third new path and the second existing path pass through a third output port of a third switch; the method further comprises: estimating, before the third new streaming session is established, a third estimated end-to-end latency variation of the second existing streaming session, as if the third new streaming session is established over the third path; the method further comprises: determining, based on comparing the third estimated end-to-end latency variation with the limit, a third determination that the third estimated end-to-end latency variation does not exceed the limit, and admitting the third request based on the third determination.

18. The method of claim 16, further comprising: receiving third capabilities of a third destination of a third existing streaming session, and allocating for the third existing streaming session a third limit for a third allowable end-to-end latency variation thereof based on the third capabilities; the method further comprises: receiving a third request to establish a third new streaming session over a third new path, in presence of the second and third existing streaming sessions; wherein the third existing session is established over a third existing path, the third new path and the second existing path pass through a third output port of a third switch, and the third new path and the third existing path pass through a fourth output port of a fourth switch; the method further comprises: estimating, before the third new streaming session is established, third and fourth estimated end-to-end latency variations of the second and third existing streaming sessions, respectively, as if the third new streaming session is established over the third new path; the method further comprises: determining, based on comparing the third and fourth estimated end-to-end latency variations with the second and the third limits, respectively, a third determination that at least one of the third and fourth estimated end-to-end latency variations exceeds the respective one of the second and third limits, and rejecting the third request based on the third determination.

19. The method of claim 12, further comprising receiving first and second maximum burst sizes of a certain streaming session and another streaming session at first and second input ports, respectively, of a certain switch; wherein the certain streaming session and the other streaming session pass through a certain output port of the certain switch; the method further comprises calculating a calculated local latency variation of the certain streaming session at the certain output port, based on the first and second maximum burst sizes.

20. The method of claim 19, further comprising receiving a local latency variation of the certain streaming sessions at another output port of another switch, and calculating the maximum burst size of the certain streaming session at the first input port of the certain switch based on the local latency variation; wherein the other output port is coupled to the first input port by a communication link selected from the communication links.

* * * * *